(12) United States Patent
Mullins

(10) Patent No.: US 9,858,707 B2
(45) Date of Patent: Jan. 2, 2018

(54) 3D VIDEO RECONSTRUCTION SYSTEM

(71) Applicant: DAQRI, LLC, Los Angeles, CA (US)

(72) Inventor: Brian Mullins, Altadena, CA (US)

(73) Assignee: DAQRI, LLC, Los Angeles, CA (US)

(*) Notice: Subject to any disclaimer, the term of this patent is extended or adjusted under 35 U.S.C. 154(b) by 0 days.

(21) Appl. No.: 15/394,740

(22) Filed: Dec. 29, 2016

(65) Prior Publication Data

US 2017/0193686 A1 Jul. 6, 2017

Related U.S. Application Data

(60) Provisional application No. 62/273,006, filed on Dec. 30, 2015.

(51) Int. Cl.
*G06T 17/20* (2006.01)
*G06T 19/20* (2011.01)
(Continued)

(52) U.S. Cl.
CPC ........ *G06T 15/205* (2013.01); *G02B 27/0172* (2013.01); *G06F 3/005* (2013.01);
(Continued)

(58) Field of Classification Search
CPC ....... G06T 19/006; G06T 17/00–17/30; G06T 7/50; G06T 7/55–7/596;
(Continued)

(56) References Cited

U.S. PATENT DOCUMENTS

| | | | |
|---|---|---|---|
| 2012/0176516 A1 | 7/2012 | Elmekies | |
| 2013/0201182 A1* | 8/2013 | Kuroki | G06T 19/20 345/419 |
| 2014/0016825 A1* | 1/2014 | Kasahara | G06T 11/00 382/103 |
| 2015/0145985 A1* | 5/2015 | Gourlay | G06T 17/00 348/135 |

(Continued)

FOREIGN PATENT DOCUMENTS

| | | |
|---|---|---|
| KR | 1020120049442 A | 5/2012 |
| KR | 101507584 B1 | 3/2015 |

OTHER PUBLICATIONS

Tompkin, James, et al. "Videoscapes: exploring sparse, unstructured video collections." ACM Transactions on Graphics (TOG) 31.4 (2012): 68.*

(Continued)

*Primary Examiner* — Daniel Hajnik
(74) *Attorney, Agent, or Firm* — Schwegman Lundberg & Woessner, P.A.

(57) ABSTRACT

A server receives video data and location data from mobile devices. Each mobile device records a video of a target. The location data identifies a position of the corresponding mobile device relative to the target and a distance between the corresponding mobile device to the target. The location data is associated with a corresponding video frame from the video data. The server identifies video frames from the video data captured from the mobile devices. The server scales parts of the identified video frames based on the position and distance of the corresponding mobile devices to the target. The server extracts the scaled parts of the identified video frames and generates a three-dimensional model of the target based on the extracted scaled parts of the identified video frames from the plurality of mobile devices.

18 Claims, 17 Drawing Sheets

(51) Int. Cl.
| | |
|---|---|
| *G06T 15/20* | (2011.01) |
| *G02B 27/01* | (2006.01) |
| *G06F 3/00* | (2006.01) |
| *G06F 3/01* | (2006.01) |
| *G06T 3/40* | (2006.01) |
| *G06T 19/00* | (2011.01) |

(52) U.S. Cl.
CPC .............. *G06F 3/012* (2013.01); *G06T 3/40* (2013.01); *G06T 19/003* (2013.01); *G06T 19/006* (2013.01); *G02B 2027/014* (2013.01); *G02B 2027/0138* (2013.01); *G02B 2027/0141* (2013.01); *G06T 2215/16* (2013.01); *G06T 2219/024* (2013.01)

(58) Field of Classification Search
CPC .................. G06K 9/00201–9/00214; G06K 9/00664–9/00704; G06K 9/00765
See application file for complete search history.

(56) References Cited

U.S. PATENT DOCUMENTS

| | | |
|---|---|---|
| 2015/0229838 A1 | 8/2015 | Hakim et al. |
| 2015/0249815 A1 | 9/2015 | Sandrew et al. |
| 2017/0076459 A1* | 3/2017 | Plowman .............. G06K 9/4604 |

OTHER PUBLICATIONS

Pan, Qi, Gerhard Reitmayr, and Tom W. Drummond. "Interactive model reconstruction with user guidance." Mixed and Augmented Reality, 2009. ISMAR 2009. 8th IEEE International Symposium on. IEEE, 2009.*

Kainz, Bernhard, et al. "OmniKinect: real-time dense volumetric data acquisition and applications." Proceedings of the 18th ACM symposium on Virtual reality software and technology. ACM, 2012.*

"International Application Serial No. PCT/US2016/069302, International Search Report dated Mar. 28, 2017".

"International Application Serial No. PCT/US2016/069302, Written Opinion dated Mar. 28, 2017", 4 pgs.

* cited by examiner

3D VIDEO RECONSTRUCTION SYSTEM

PRIORITY APPLICATION

This application claims priority to U.S. Provisional Application Ser. No. 62/273,006, filed Dec. 30, 2015, the disclosure of which is incorporated herein in its entirety by reference.

TECHNICAL FIELD

The subject matter disclosed herein generally relates to the technical field of video processing. Specifically, the present disclosure addresses systems and methods to use video captured from mobile devices to reconstruct a three dimensional object.

BACKGROUND

Reconstruction of a three-dimensional model of an animated physical object (e.g., a musician playing a guitar) typically requires multiple cameras statically positioned at predefined locations around the physical object. The cameras are pointed at the physical object and can record a video of the animated physical object. Such systems require that the position between the cameras and the physical object, and the position between the cameras themselves, be known.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
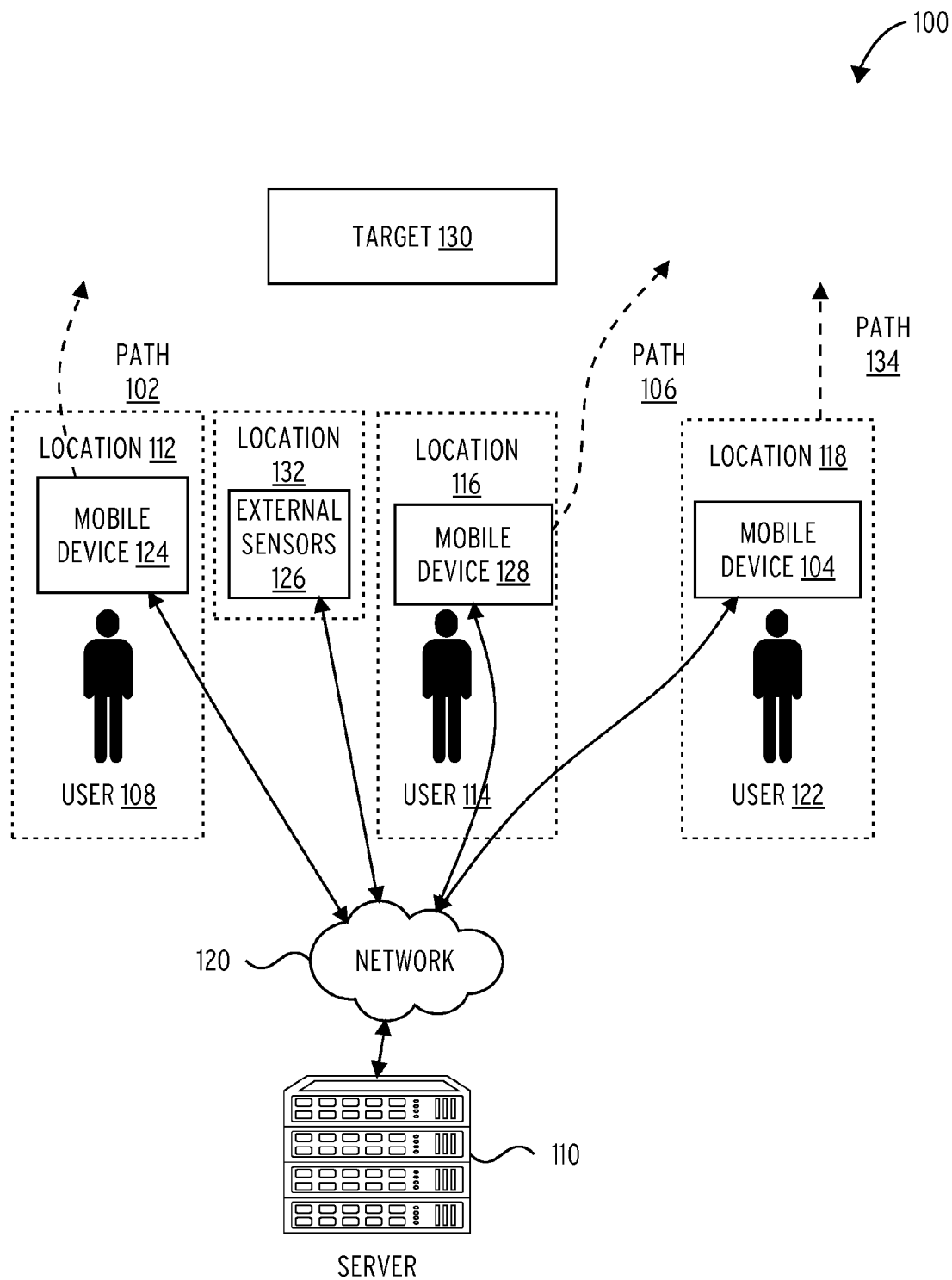
FIG. 1 is a block diagram illustrating an example of a network environment suitable for a system for three-dimensional video reconstruction, according to some example embodiments.

Example methods and systems are directed to a system for using multiple mobile devices to reconstruct a three-dimensional model of a physical object. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Reconstruction of a three-dimensional model of an animated physical object typically requires multiple cameras that are statically positioned at predefined locations around the physical object. The cameras are pointed at the physical object and record a video of the animated physical object. Such systems require that the location and position of the cameras be fixed. Instead of using multiple cameras at preset locations, the present application describes a system that comprises multiple mobile devices with cameras. Each mobile device can move about the physical object (also referred to as a target) and is not restricted to staying in one location. For example, several users, each wearing a mobile device, can walk around the physical object and record a video of the physical object from their respective cameras. Each mobile device include a computing device. The computing device may include a head-mounted device (HMD) such as a helmet or eyeglasses. The computing device may include a display screen. Each mobile device comprises a depth sensor to determine a distance to the physical object. Furthermore, inertial and optical sensors in the mobile devices may be used to determine their respective location relative to the physical object. The combined data from the camera, depth sensor, and inertial and optical sensors may be used to compute and reconstruct a three-dimensional model of the physical object. The three-dimensional model may include a recreated three-dimensional video of the physical object viewable from different angles.

In another example embodiment, the mobile devices can further display augmented information. For example, an Augmented Reality (AR) application in a mobile device allows a user to experience information, such as in the form of a virtual object (e.g., a three-dimensional model of a virtual dinosaur) overlaid on an image of the physical object captured by a camera of the mobile device (or a viewing device). The viewing device may include a tablet or a smartphone. The virtual object may be displayed in a transparent or clear display (e.g., see-through display) of the viewing device. The physical object may include a visual reference (e.g., uniquely identifiable pattern on a physical object) that the AR application can recognize. A visualization of the additional information, such as the virtual object overlaid or engaged with an image of the physical object, is generated in the display of the viewing device. The viewing device generates the virtual object based on the recognized visual reference (e.g., QR code) or captured image of the physical object (e.g., image of a logo). The viewing device displays the virtual object based on a relative position between the viewing device and the visual reference. For example, a virtual dinosaur appears closer and bigger when the viewing device is held closer to the visual reference associated with the virtual dinosaur. Similarly, the virtual dinosaur appears smaller and farther when the viewing device is moved further away from the virtual reference associated with the virtual dinosaur. The virtual object may include a three-dimensional model of a virtual object or a two-dimensional model of a virtual object. For example, the three-dimensional model includes a three-dimensional view of a chair. The two-dimensional model includes a two-dimensional view of a dialog box, menu, or written information such as statistics information for a baseball player. The viewing device renders an image of the three-dimensional or two-dimensional model of the virtual object in the display of the viewing device.

The mobile device may display a virtual path for the user to move along so as to provide a higher resolution of the video of the target. For example, the mobile device may instruct the corresponding user to move along a virtual path to be closer to a left side of the physical object. In other examples, the virtual path may be computed based on a quality of the reconstruction of the three-dimensional physical object. If the three-dimensional reconstruction has a gap, the system may identify which mobile device can remedy the gap, generate a virtual path that helps remedy the gap, and instruct that mobile device to move along the virtual path.

In one example embodiment, a server receives video data and location data from mobile devices. Each mobile device records a video of a target. The location data identifies a position of the corresponding mobile device relative to the target and a distance between the corresponding mobile device to the target. The location data is associated with a corresponding video frame from the video data. The server identifies video frames from the video data captured at a same time from the mobile devices. The server scales parts of the identified video frames based on the position and distance of the corresponding mobile devices to the target. The server extracts the scaled parts of the identified video frames having overlapping content and generates a three-dimensional model of the target based on the extracted scaled parts of the identified video frames from the plurality of mobile devices.

FIG. 1 is a block diagram illustrating an example of a network environment suitable for a system for three-dimensional video reconstruction, according to some example embodiments. A network environment 100 includes mobile devices 124, 128, 104, respectively located at locations 112, 116, and 118. The network environment 100 further includes external sensors 126 at a location 132, and a server 110, communicatively coupled to each other and the mobile devices 124, 128, and 104 via a network 120. The mobile devices 104, 112, 116 and the server 110 may each be implemented in a computer system, in whole or in part, as described below with respect to FIG. 17.

The server 110 may be part of a network-based system. For example, the network-based system may be or include a cloud-based server system that constructs a three-dimensional model based on the video and location data from the mobile devices 124, 128, and 104, and generates additional information (e.g., augmented information for display in one of the mobile devices or in another viewing device) such as 3D models or other virtual objects (e.g., suggest virtual walking path), to the mobile devices 104, 124, 128.

The mobile devices 124, 128, and 104 each include a computing device and a transparent (e.g., see-through) display that displays synthetic information in a layer added onto a field of view of the respective users 108, 114, and 122. For example, the user 108 may wear the mobile device 124 and look at the target 130 (e.g., a singer) in a real world physical environment (e.g., a stage). The user 108 may see augmented information on top of the target 130. The augmented information, for example, may identify the singer as a target for three-dimensional reconstruction. For example, the user 108 may perceive a virtual arrow above the head of the singer and pointing towards the singer to identify him/her as the target.

Each user may be located at a different location around the target 130. The locations may or may not be predefined. For example, the users may be located at specific preconfigured locations around the target 130. In another example, the users may be randomly located around the target 130 (and within a preset radius of the target 130). For example, mobile devices that are located within a preset radius of the target 130 are identified to contribute towards capturing data to build the 3D model of the target 130.

In another example, some users may move about the target 130, while other users may remain at a fixed location relative to the target 130. Thus, the location of the one or more users may be static or dynamic relative to the target 130. For example, users 108, 114, 122 may all move along a corresponding path 102, 106, 134. The path may be random or undefined. In another example, the path may be directed by the server 110. One or more users may be at a fixed predefined location relative to the target 130 to act as a reference point in space and provide a frame of reference.

The users 108, 114, 122 may be a human user (e.g., a human being), a machine user (e.g., a computer configured by a software program to interact with the mobile devices 124, 128, 104), or any suitable combination thereof (e.g., a human assisted by a machine or a machine supervised by a human). The users 108, 114, 122 are not part of the network environment 100, but are associated with the mobile devices 124, 128, 104. For example, the mobile device 124 may be a computing device with a camera and a display such as a tablet, smartphone, or a wearable computing device (e.g., helmet or glasses). In another example embodiment, the computing device may be hand-held or may be removably mounted to the head of the users 108, 114, 122. In one example, the display may be a screen that displays what is captured with a camera of the mobile devices 124, 128, 104. In another example, the display of the mobile devices 124, 128, 104 may be transparent such as in lenses of wearable computing glasses or the visor or a face shield of a helmet.

For example, the user 108 may be a user of an AR application in the mobile device 124 and at the server 110. The AR application may provide the user 102 with an AR experience triggered by identified objects (e.g., target 130) in the physical environment. For example, the target 130 may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment. The AR application may include computer vision recognition to determine corners, objects, lines, letters, and the like. In one example embodiment, the AR application includes several tasks or operations for the user to perform with respect to the target 130. For example, one task may be to scan the target 130 by capturing video of the target 130 from different locations at the sme time. The user 108 may select the task from a menu of tasks from the AR application. In another example, the task may be already pre-assigned to the user 108. For example, the server 110 assigns a task of observing the target 130.

In one example embodiment, the objects in the video data or images captured by the mobile device 124 are tracked and recognized locally in the mobile device 124 using a local context recognition dataset or any other previously stored dataset of the AR application of the mobile device 124. The local context recognition dataset module may include a library of virtual objects associated with real-world physical objects or references. In one example, the mobile device 124 identifies feature points (e.g., uniquely identifiable patterns such as using facial recognition for a person) in an image of the target 130. The mobile device 124 may also identify tracking data related to the target 130 (e.g., location of the target 130, GPS location of the mobile device 124, orientation, and distance to the target 130). If the captured image is not recognized locally at the mobile device 124, the mobile device 124 can download additional information (e.g., 3D model or other augmented data) corresponding to the captured image, from a database of the server 110 over the network 120.

In another example embodiment, the target 130 in the image captured by the mobile device 124 is tracked and recognized remotely at the server 110 using a remote context recognition dataset or any other previously stored dataset of an AR application in the server 110. The remote context recognition dataset module may include a library of virtual objects or augmented information associated with real-world physical objects or references.

Similarly, the mobile device 124 identifies feature points in an image of the target 130. The mobile device 124 may use other techniques such as 3D mapping and depth sensing to map the presence of the target 130. Other techniques (e.g., machine-vision algorithm) can be used to identify the target 130.

External sensors 126 located at a predefined location 132 may be used to measure a location, status, and characteristics of the target 130. Examples of measured readings may include and but are not limited to presence, weight, pressure, temperature, velocity, direction, position, intrinsic and extrinsic properties, acceleration, and dimensions. For example, external sensors 126 may be disposed throughout around the target 130 or a building to measure movement, pressure, orientation, and temperature. The external sensors 126 can also be used to measure a location, status, and characteristics of the mobile devices 124, 128, 104. The server 110 can compute readings from data generated by the external sensors 126 and generate virtual indicators such as vectors or colors based on data from external sensors 126. Virtual indicators (e.g, heart rate of singer) are then overlaid on top of a live image or a view of the target 130 in a line of sight of the corresponding user to show data related to the target 130. For example, the virtual indicators may include arrows with shapes and colors that change based on real-time data. The mobile devices 124, 128, 104 can render the virtual indicators in the transparent display of the corresponding mobile device. In another example embodiment, the virtual indicators are rendered at the server 110 and streamed to the mobile devices 124, 128, 104.

In another example embodiment, the external sensors 126 may include sensors used to track the location, movement, and orientation of the mobile devices 124, 128, 104 externally without having to rely on sensors internal to the mobile devices 124, 128, 104. The external sensors 126 may include optical sensors (e.g., depth-enabled 3D camera), wireless sensors (Bluetooth, Wi-Fi), GPS sensors, and audio sensors to determine the location of the user 108 wearing the mobile device 124, distance between the user 108 and the external sensors 126 (e.g., sensors placed in corners of a venue or a room), the orientation of the mobile device 124 to track what the user 108 is looking at (e.g., direction at which the mobile device 124 is pointed, e.g., mobile device 124 pointed towards a player on a tennis court, mobile device 124 pointed at the target 130).

In another example embodiment, data from the external sensors 126 and internal sensors in the mobile device 124 may be used for analytics data processing at the server 110 (or another server) for analysis on usage and how the user 108 is interacting with the target 130 in the physical environment. Live data from other servers may also be used in the analytics data processing. For example, the analytics data may track at what locations (e.g., points or features) on the physical or virtual object the user 108 has looked, how long the user 108 has looked at each location on the physical or virtual object, how the user 108 wore the mobile device 124 when looking at the physical or virtual object, which features of the virtual object the user 108 interacted with (e.g., such as whether the user 108 engaged with any virtual object), and any suitable combination thereof. The mobile device 124 receives a visualization content dataset related to the analytics data. The mobile device 124 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 17. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 120 may be any network that enables communication between or among machines (e.g., server 110), databases, and devices (e.g., device 101). Accordingly, the network 120 may be a wired network, a wireless network (e.g., a mobile or cellular network), or any suitable combination thereof. The network 120 may include one or more portions that constitute a private network, a public network (e.g., the Internet), or any suitable combination thereof.

Figure 2:
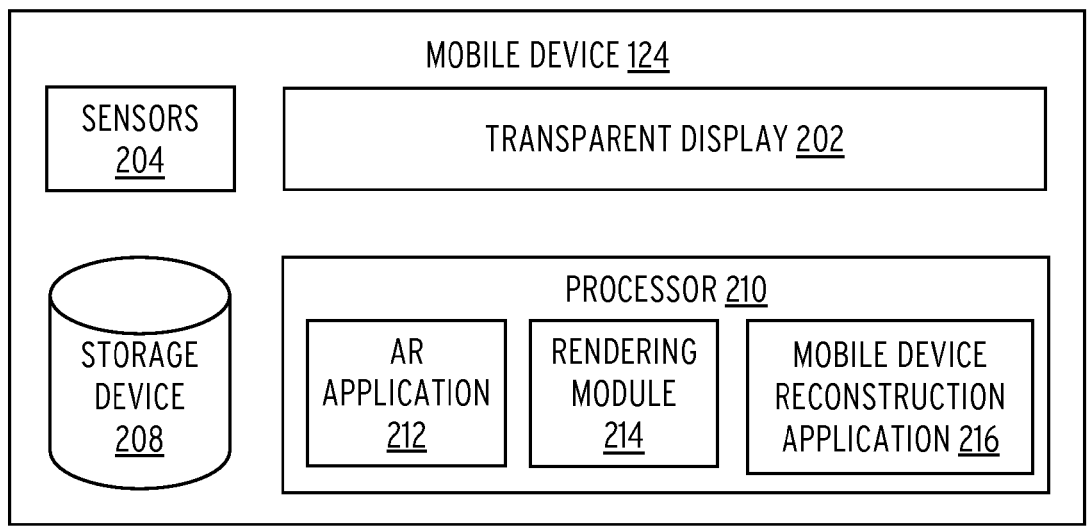
FIG. 2 is a block diagram illustrating an example embodiment of modules (e.g., components) of a mobile device.

FIG. 2 is a block diagram illustrating an example embodiment of modules (e.g., components) of a mobile device.

The mobile device 124 includes sensors 204, a transparent display 202, a processor 210, and a storage device 208. For example, the mobile device 124 may include a helmet, a visor, or any other device that can be worn on a user's 108 head.

The sensors 204 include, for example, a thermometer, an infrared camera, a barometer, a humidity sensor, an electroencephalogram (EEG) sensor, a proximity or location sensor (e.g, near field communication, GPS, Bluetooth, Wifi), an optical sensor (e.g., camera), an orientation sensor (e.g., gyroscope), an audio sensor (e.g., a microphone), or any suitable combination thereof. For example, the sensors 204 may include a rear facing camera and a front facing camera in the mobile device 124. It is noted that the sensors described herein are for illustration purposes and the sensors 204 are thus not limited to the ones described.

The transparent display 202 includes, for example, a display configured to display images generated by the processor 210. The transparent display 202 may be a see-through or translucent display so that the user 108 can see through the display when no images are being rendered in the transparent display 202. In another example, the transparent display 202 includes a touch sensitive surface to receive a user input via a contact on the touch sensitive surface.

The processor 210 includes an AR application 212, a rendering module 214, and a mobile device reconstruction application 216. The AR application 212 receives data from sensors 204 (e.g., receives an image of the target 130) and identifies and recognizes the target 130 using machine-vision recognition techniques. The AR application 212 then retrieves from the storage device 208 AR content associated with the target 130. In one example embodiment, the AR application 212 identifies a visual reference (e.g., a predefined logo or QR code on a t-shirt of a singer) on the target 130 and tracks the location of the visual reference within the transparent display 202 of the mobile device 124. The visual reference may also be referred to as a marker and may consist of an identifiable image, symbol, letter, number, or machine-readable code. For example, the visual reference may include a bar code, a QR code, or an image that has been previously associated with the virtual object.

The rendering module 214 renders virtual objects based on data from sensors 204 and from AR content received from the server 110. For example, the rendering module 214 renders a display of a virtual path (e.g., dotted lines on the floor) based on video data captured by the mobile devices 124, 128, 104. Another example includes displaying a three-dimensional model of the virtual object (e.g., 3D model of a paved path) associated with the target 130 in the transparent display 202. In another example, the rendering module 214 generates a display of the virtual object overlaid on an image of the target 130 captured by a camera of the mobile device 124. The virtual object may be further manipulated within the transparent display 202 by the user 108 moving around the target 130 or turning their head in a different direction.

In another example embodiment, the rendering module 214 includes a local rendering engine that generates a visualization of a three-dimensional virtual object overlaid (e.g., superimposed upon, or otherwise displayed in tandem with) on an image of the target 130 captured by a camera of the mobile device 124 or a view of the target 130 in the transparent display 202 of the mobile device 124. A visualization of the three-dimensional virtual object may be manipulated by adjusting a position of the mobile device 124 (e.g., its physical location, orientation, or both) relative to the target 130.

In another example embodiment, the rendering module 214 determines whether the captured image matches an image locally stored in the storage device 208 that includes a local database of images and corresponding additional information (e.g., three-dimensional model and interactive features). The rendering module 214 retrieves a primary content dataset from the server 110, and generates and updates a contextual content dataset based on an image captured with the mobile device 124.

The mobile device reconstruction application 216 is configured to communicate video and location data from the sensors 204 of the mobile device 124 to the server 110. The video data may include, for example, video frames or a live video feed. The location data may include GPS location, depth data related to a depth of the target 130 from the mobile device 124, and/or orientation and position of the mobile device 124 (e.g., user 108 looking up/down/left/right relative to the target 130, user 108 is located in front or behind the target 130).

Furthermore, the mobile device reconstruction application 216 receives AR content from the server 110. The AR content may include instructions for the user 108 to move along a predefined path included in the AR content. For example, the AR content may include a virtual line or virtual arrow perceived to be displayed on a real physical floor for the user 108 to follow. The AR content may further display visual objects to guide the user 108 in orienting the mobile device 124. For example, the AR content may include a virtual arrow for the user 108 to look left. In yet another example, the AR content may include a virtual object identifying the target 130 and displayed so that the user 108 perceives the virtual object on top of the target 130.

The storage device 208 stores an identification of the sensors and their respective functions. The storage device 208 further includes a database of visual references (e.g., images, visual identifiers, features of images) and corresponding experiences (e.g., three-dimensional virtual objects, interactive features of the three-dimensional virtual objects). For example, the visual reference may include a machine-readable code or a previously identified image (e.g., a picture of a singer). A reconstructed three-dimensional model of the target 130 may be viewed from different angles by manipulating the position of a viewing device relative to a physical object associated with an identifier of the target 130. For example, a viewing device (e.g., another mobile device) located in a remote location distant from the target 130 (e.g., in another country) may be able to view a live three-dimensional model of the target 130 by looking at a physical identifier (e.g., identifier such as a QR code). The user of the viewing device would be able to view the live three-dimensional model of the target 130 by moving about the physical identifier or moving the physical identifier itself (e.g., picking up the piece of paper on which the QR code is printed).

Features of the live three-dimensional model may include selectable areas on the three-dimensional virtual model of the target 130. An icon may be selected or activated using a user interface on the viewing device.

In another example embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images of the most popular images determined by the server 110. The core set of images may include a limited number of images identified by the server 110. For example, the core set of images may include the images depicting covers of the ten most popular targets and their corresponding experiences (e.g., virtual objects that represent the ten most viewed targets). In another example, the server 110 may generate the first set of images based on the most popular or often scanned images received at the server 110. Thus, the primary content dataset does not depend on objects or images scanned by the rendering module 214 of the mobile device 124.

The contextual content dataset includes, for example, a second set of images and corresponding experiences (e.g., three-dimensional virtual object models) retrieved from the server 110. For example, images captured with the mobile device 124 that are not recognized (e.g., by the server 110) in the primary content dataset are submitted to the server 110 for recognition. If the captured image is recognized by the server 110, a corresponding experience may be downloaded at the mobile device 124 and stored in the contextual content dataset. Thus, the contextual content dataset relies on the context in which the mobile device 124 has been used. As such, the contextual content dataset depends on objects or images scanned by the rendering module 214.

In one embodiment, the mobile device 124 may communicate over the network 120 with the server 110 to retrieve a portion of a database of visual references, corresponding three-dimensional virtual objects, and corresponding interactive features of the three-dimensional virtual objects. The network 120 may be any network that enables communication between or among machines, databases, and devices (e.g., the mobile devices 124, 128, 104). Accordingly, the network 120 may be a wired network, a wireless network (e.g., a mobile or cellular network), or any suitable combination thereof. The network 120 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
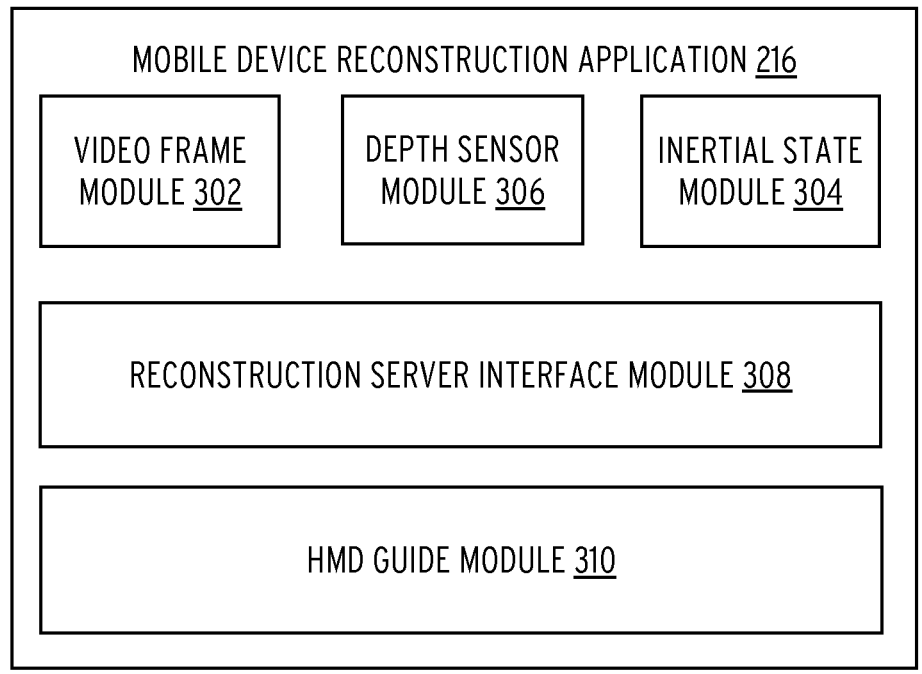
FIG. 3 illustrates an example embodiment of a mobile device reconstruction application.

FIG. 3 illustrates an example embodiment of a mobile device reconstruction application. The mobile device reconstruction application 216 includes a video frame module 302, a depth sensor module 306, an inertial state module 304, a reconstruction server interface module 308, and a mobile device guide module 310.

The video frame module 302 generates the video data from the sensors 204. For example, the video frame module 302 may generate a live video feed of images captured by cameras on the mobile device 124. The video frame module 302 may send a picture captured at a predefined interval or may send a video frame captured at the rate of video capture of the sensors 204.

The depth sensor module 306 generates depth related data based on a depth sensor from sensors 204. For example, the depth sensor module 306 may generate real-time distance data between the mobile device 124 and the target 130. Furthermore, the depth sensor module 306 may be used to generate depth data related to the surface of the target 130 by scanning the surface of the target 130. The depth sensor module 306 may include a 3D camera system that include at least two or more cameras positioned at predefined locations on the mobile device 124. The 3D camera system can extrapolate the depth of objects in images based on the image data captured from the two or more cameras.

The inertial state module 304 generates inertial and position data of the mobile device 124. For example, the sensors 204 may include a three-axis gyroscope and accelerometer to determine a position and orientation of the mobile device 124. Furthermore, the inertial state module 304 may be used to determine a location relative to a frame of reference. For example, by using a known location of one or more static references (e.g., a marker or another mobile device), the inertial state module 304 can triangulate its location relative to the frame of reference based on the static references. In another example, the location of the mobile device 124 may be determine based on the external sensors 126. The inertial state module 304 may determine a projected trajectory of the mobile device 124 based on the inertial and position data of the mobile device 124.

The reconstruction server interface module 308 provides the video data from the video frame module 302, depth-related data from the depth sensor module 306, and inertial and position data from the inertial state module 304 to the server 110. In another example, the reconstruction server interface module 308 is configured to interface with the server 110 to receive and send data related to reconstructing a three-dimensional model of the target 130.

The mobile device guide module 310 is configured to communicate with the server 110 to receive AR content related to the reconstruction of the three-dimensional model of the target 130. For example, the mobile device guide module 310 renders AR content used to generate a virtual path for the user 108 of the mobile device 124 to follow so as to enhance the three-dimensional model of the target 130. The AR content may include a first virtual object identifying the target 130 and a second virtual object identifying a direction for the user 108 to move towards.

Figure 4:
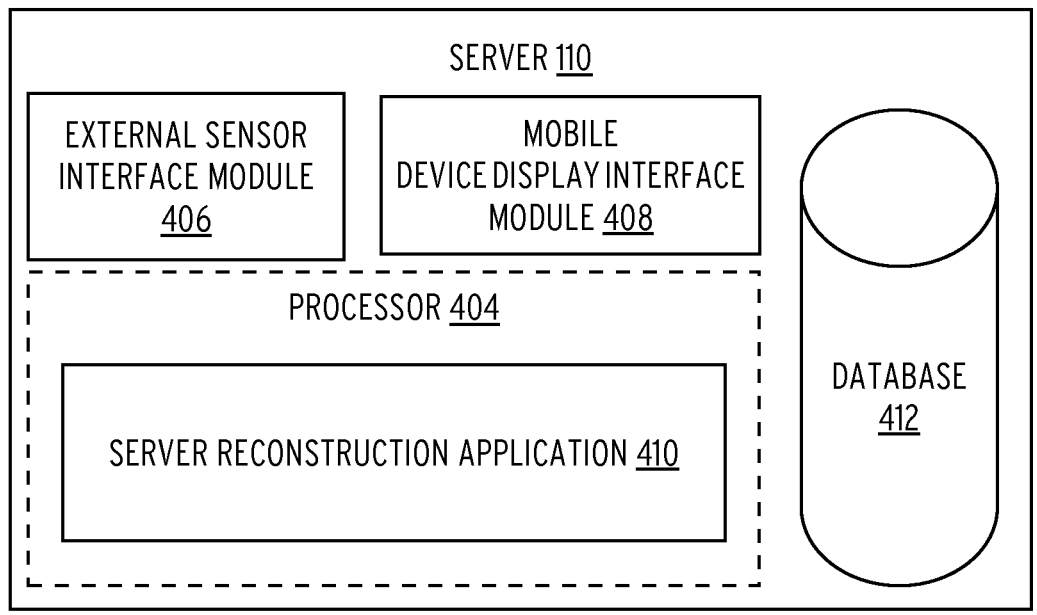
FIG. 4 a block diagram illustrating an example embodiment of a server.

FIG. 4 is a block diagram illustrating an example embodiment of a server. The server 110 includes an external sensor interface module 406, a head-mounted display interface module 408, a processor 404, and a database 412.

The external sensor interface module 406 is configured to communicate with the external sensors 126 to receive sensor data related to the mobile devices 124, 128, 104, and the target 130. For example, the external sensor interface module 406 determines the locations of the mobile devices 124, 128, 104, and the target 130, the distances between the mobile devices 124, 128, 104, and the target 130, and the relative orientation between the mobile devices 124, 128, 104, and the target 130. The external sensor interface module 406 may further determine data related to the target 130. For example, the external sensor interface module 406 may receive data (images or video) from the external sensors 126 to identify the target 130 and data related to a status of the target 130 (e.g, the singer is singing or resting).

The head-mounted display interface module 408 is configured to communicate with the mobile devices 124, 128, 104 located at the different locations around the target 130. The head-mounted display interface module 408 receives video and location data from the mobile devices 124, 128, 104 to generate a reconstruction of a real-time 3D model of the target 130.

The processor 404 includes a server reconstruction application 410 that generates an interactive real-time 3D model of the target 130 based on the data received from the external sensor interface module 406 and the head-mounted display interface module 408. For example, the server reconstruction application 410 combines video frames from the mobile devices based on their location and a viewing angle of the target 130. In another example, the head-mounted display interface module 408 renders a three-dimensional object based on the combined video data and the corresponding location data. The server reconstruction application 410 is described in more detail with respect to FIG. 5.

In another example embodiment, the server reconstruction application 410 provides feedback to the mobile devices based on their respective orientation and position. For example, the server 110 may identify that one of the mobile device is located in the best location to capture a missing side or feature of the target 130. The server 110 may generate virtual content to that mobile device to instruct the corresponding user to move or re-orient in a particular position or direction.

The database 412 stores data received from the external sensor interface module 406 and the head-mounted display interface module 408. The database 412 may store the 3D model of the target 130 and AR content related to the 3D model and corresponding to one or more mobile devices.

Figure 5:
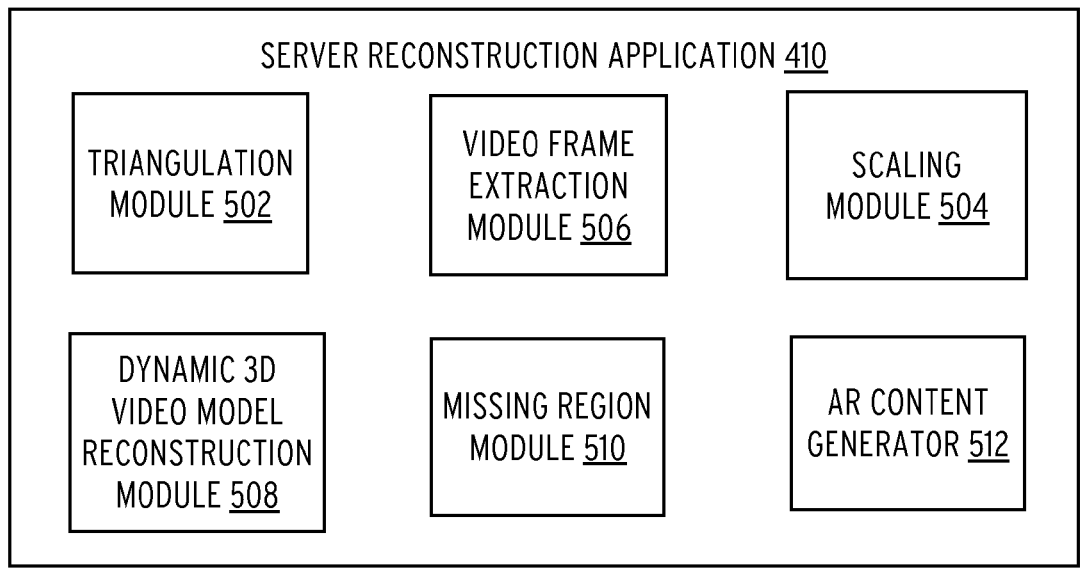
FIG. 5 illustrates an example embodiment of a server reconstruction application.

FIG. 5 illustrates an example embodiment of a server reconstruction application. The server reconstruction application 410 includes a triangulation module 502, a video frame extraction module 506, a scaling module 504, a dynamic 3D video model reconstruction module 508, a missing region module 510, and an AR content generator 512.

The triangulation module 502 determines the relative location and position of a mobile device with respect to the target 130. For example, the triangulation module 502 determines the distance between the mobile device 124 and the target 130, whether the target 130 is within a field of view of the mobile device 124, and the relative orientation of the mobile device 124 (e.g., the target 130 is to the left of the mobile device 124).

The video frame extraction module 506 receives video data from the mobile devices and process it by extracting video frames from the video data. In one example embodiment, the video frame extraction module 506 extracts a video of the target 130 and filters out a background of the target 130.

The scaling module 504 scales the image of the target 130 in the video frames based on the distance of the corresponding mobile device to the target 130. For example, the target 130 appears smaller in a video frame from a first mobile device located further away from the target 130 than in a video frame of a second mobile device located closer to the target 130. Thus, the scaling module 504 scales the video frame from the first mobile device to make the target 130 appear larger. The scaling module 504 scales the video frame from the second mobile device to make the target 130 appear smaller so that the target 130 in both video frames appears to have the same size.

The dynamic 3D video model reconstruction module 508 matches images of common areas from the scaled video frames from scaling module 504. Using this matching process, the dynamic 3D video model reconstruction module 508 is able to create a patch of images from the scaled video frame. The dynamic 3D video model reconstruction module 508 may use the patch of images and their respective location data and depth data to reconstruct the 3D model of the target 130. For example, the dynamic 3D video model reconstruction module 508 generates a 3D mesh of the real world scene based on image data (including depth data) from the multiple camera angles and assign corresponding characteristics (e.g., color, texture, light) based on the captured video. Those of ordinary skill in the art will recognize that 3D reconstruction is a process that generates three-dimensional models from multiple image feeds. In other words, the dynamic 3D video model reconstruction module 508 convers multiple 2D images from multiple camera angles into a 3D model.

The missing region module 510 determines areas in the 3D model that are missing. Missing areas may be the result of insufficient data or video frames from the mobile devices. For example, if the mobile device 124 is only capturing a left side of the target 130 and the mobile device 104 is only capturing a right side of the target 130, then images from the center or middle of the target 130 are missing and create a gap. Therefore, the dynamic 3D video model reconstruction module 508 may lack the data to reconstruct a full 3D model of the target 130. In another example embodiment, the missing region module 510 further identifies which mobile device is best positioned to remedy that gap. For example, the missing region module 510 determines that one of the mobile devices is located close to the target 130 but is not facing the target 130. The missing region module 510 determines that the mobile device is best suited to generate video data of the missing region based on its close proximity to the target 130. The missing region module 510 may then notify that mobile device to turn around and face the target 130 to capture video data related to the missing region and fill in the gap for the 3D model.

The AR content generator 512 generates AR content related to the target 130. For example, the AR content may identify the target 130 as the target for a 3D reconstruction model application. The AR content may include a virtual arrow hovering above the target 130 and pointing towards the target 130. The AR content may be rendered and displayed in the mobile devices such that when the corresponding user looks at the target 130 with the corresponding mobile device, the corresponding user perceives the virtual arrow as hovering above the target 130 and pointing towards the target 130.

In another example embodiment, the AR content generator 512 generates a virtual object based on the missing region module 510. For example, the missing region module 510 identifies the mobile device 124 to remedy the gap in the 3D model or increase the resolution of the 3D model. The AR content generator 512 generates a virtual path based on the information from the missing region module 510. The missing region module 510 may determine an optimal path or a direction for the corresponding user to move or walk to capture video data related to the missing region or gap. The AR content may include virtual lines to guide the user 108. The mobile device 124 may generate a display of the virtual lines in the transparent display 202 so that the user perceives the lines on the ground. The virtual lines may be adjusted based on the location or direction of the user. In other examples, virtual arrows in the transparent display 202 may be displayed for the user 108 to turn his/her head in the suggested direction to capture video data of a relevant region on the target 130.

Figure 6:
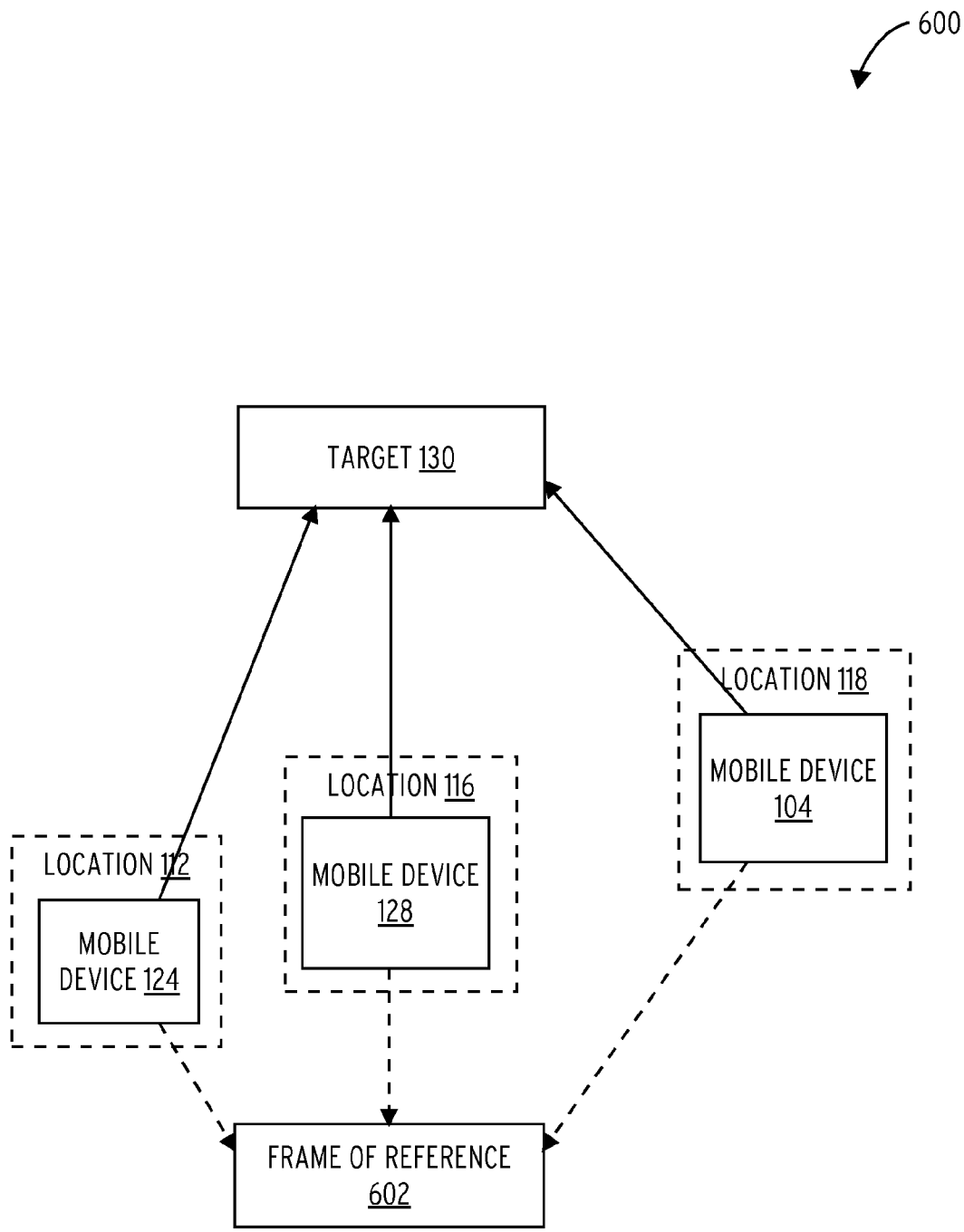
FIG. 6 is a block diagram illustrating an example of a system for a three-dimensional video reconstruction, according to some example embodiments.

FIG. 6 is a block diagram illustrating an example of a system 600 for a three-dimensional video reconstruction, according to some example embodiments. The mobile device 124 is located at location 112 to the front left of the target 130. The mobile device 128 is located at location 116 to the center front of the target 130. The mobile device 104 is located at location 118 to the right front of the target 130.

The mobile devices maybe be communicatively coupled to each other via the network 120 and the server 110 (not shown). In one example embodiment, the mobile devices may be positioned and fixed at their respective locations. The location of the mobile devices may also be determined in relation to a frame of reference 602. The frame of reference 602 may be based on unique static identifiers (e.g., corners of a room, a clock on a wall, or any other static and uniquely identifiable object that can be used as a reference) located at a location (e.g., a room) encompassing locations 112, 116, and 118.

Figure 7:
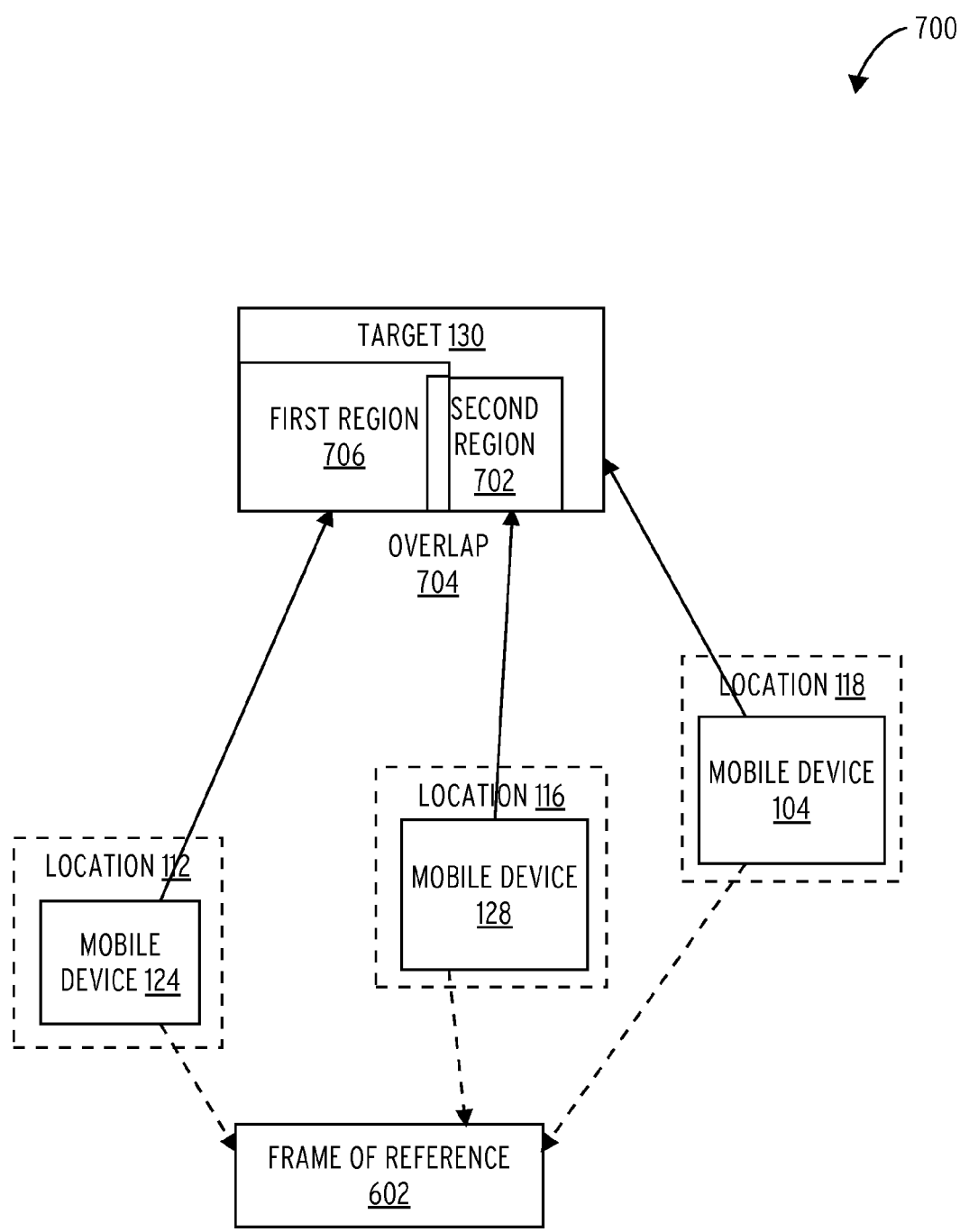
FIG. 7 is a block diagram illustrating an example of a system for a three-dimensional video reconstruction, according to some example embodiments.

FIG. 7 is a block diagram illustrating an example of a system 700 for a three-dimensional video reconstruction, according to some example embodiments. The mobile device 124 captures a video of a first region 706 on the target 130. The mobile device 128 captures a video of a second region 702 on the target 130. The first region 706 and second region 702 share an overlap 704. The overlap 704 includes a portion of the video common to both the first region 706 and the second region 702.

In one example embodiment, prior to identifying the overlap 704, the server 110 scales the picture of the first region 706 based on the distance of the mobile device 124 to the target 130. The server 110 also scales the picture of the second region 702 based on the distance of the mobile device 128 to the target 130.

Figure 8:
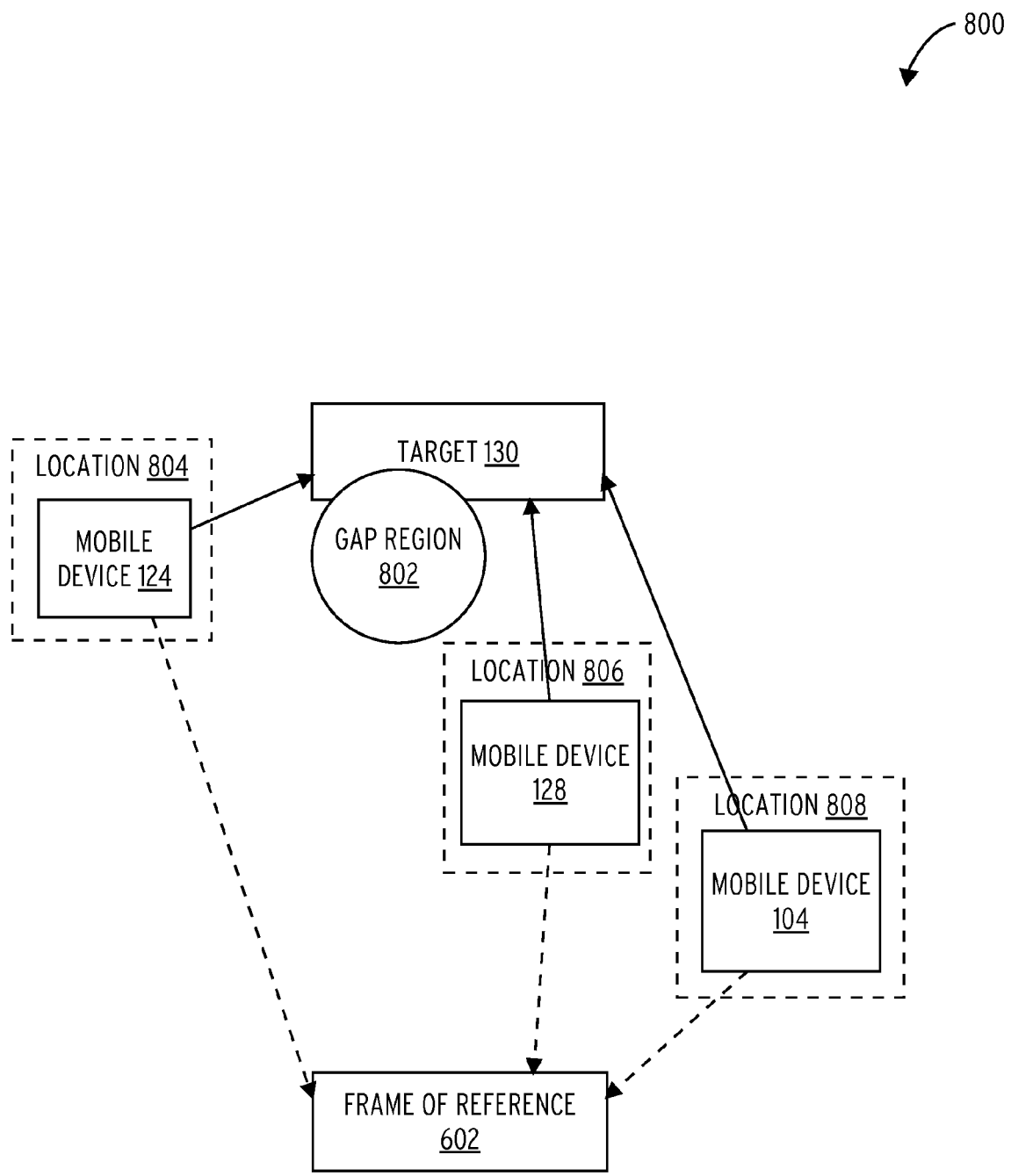
FIG. 8 is a block diagram illustrating an example of another network environment suitable for a system for a three-dimensional video reconstruction, according to some example embodiments.

FIG. 8 is a block diagram illustrating another example of a network environment 800 suitable for a three-dimensional video reconstruction, according to some example embodiments. The mobile device 124 is located at a location 804 relative to the frame of reference 602. From there, the mobile device 124 captures a left view of the target 130. The mobile device 128 and the mobile device 104 capture a video of the target 130 from locations 806 and 808. A gap region 802 is formed because there is no mobile device capturing the gap region 802 in a central region of the target 130.

The server 110 may also determine the gap region 802 based on the video frames from the mobile devices 124, 128, and 104. The gap region 802 is formed because there is no overlap from any of the video frames.

Figure 9:
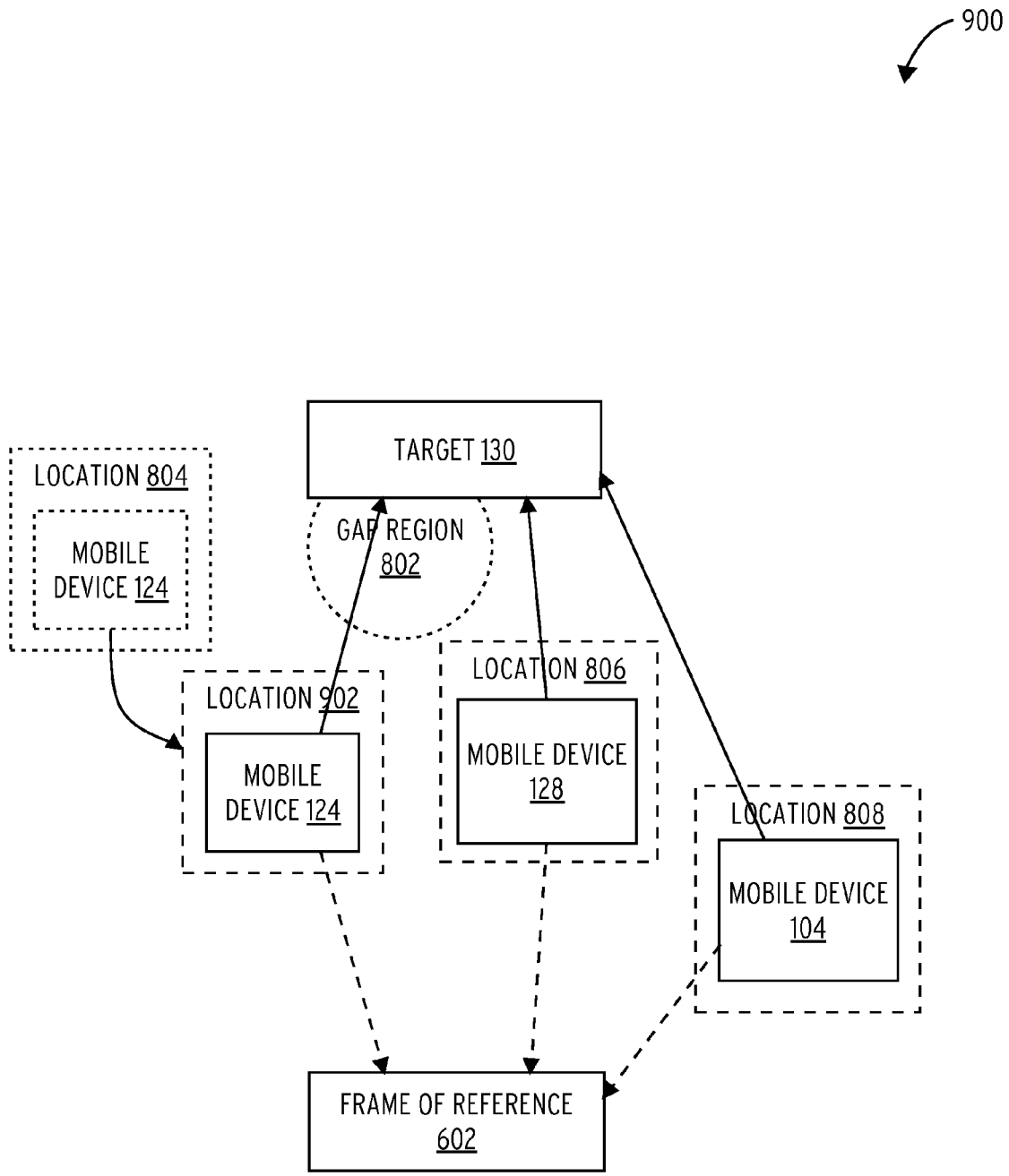
FIG. 9 is a block diagram illustrating another example of a network environment suitable for a system for a three-dimensional video reconstruction, according to some example embodiments.

FIG. 9 is a block diagram illustrating another example of a network environment 900 suitable for a system for a three-dimensional video reconstruction, according to some example embodiments. The server 110 may determine the which mobile device is located or positioned closest to a position or orientation of capturing video from the gap region 802 of the target 130. For example, the server 110 may instruct either the mobile device 124 or the mobile device 128 to move to location 902. The server 110 may identify a mobile device based on a comparison of the distance between the location 804 and location 902 and the distance between the location 806 and location 902 and select the mobile device with the shortest distance.

Once the server 110 identifies which mobile device is best suited to move, the server 110 sends AR content to the corresponding mobile device to remedy the gap region 802. For example, the server 110 may send AR content that generates visual prompts or instructions for the mobile device 124 to move from location 804 to location 902 to capture a view of the target 130 corresponding to the gap region 802.

Figure 10:
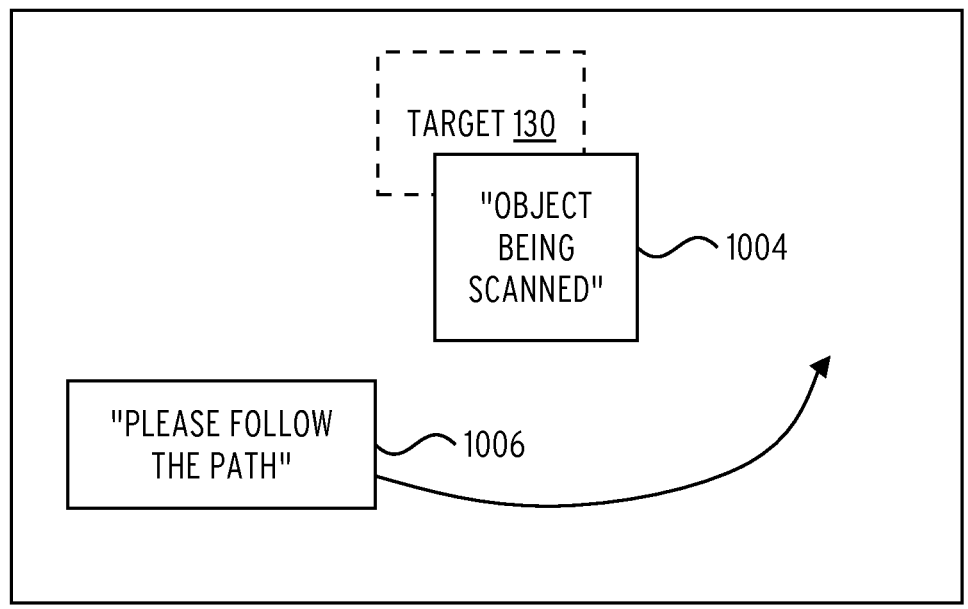
FIG. 10 is a diagram illustrating an example of a view in a transparent display of a mobile device, according to some example embodiments.

FIG. 10 is a diagram illustrating an example of a view of a transparent display of a mobile device, according to some example embodiments. The transparent display 202 shows two virtual objects rendered on top of the target 130. For example, a first virtual object 1004 identifies the target 130 as the object being scanned. The first virtual object 1004 may be rendered on top of the target 130. The second virtual object 1006 displays a virtual path for the user to follow. The virtual path may be rendered in a bottom portion of the transparent display 202 and show a direction or path for the corresponding user to follow.

Figure 11:
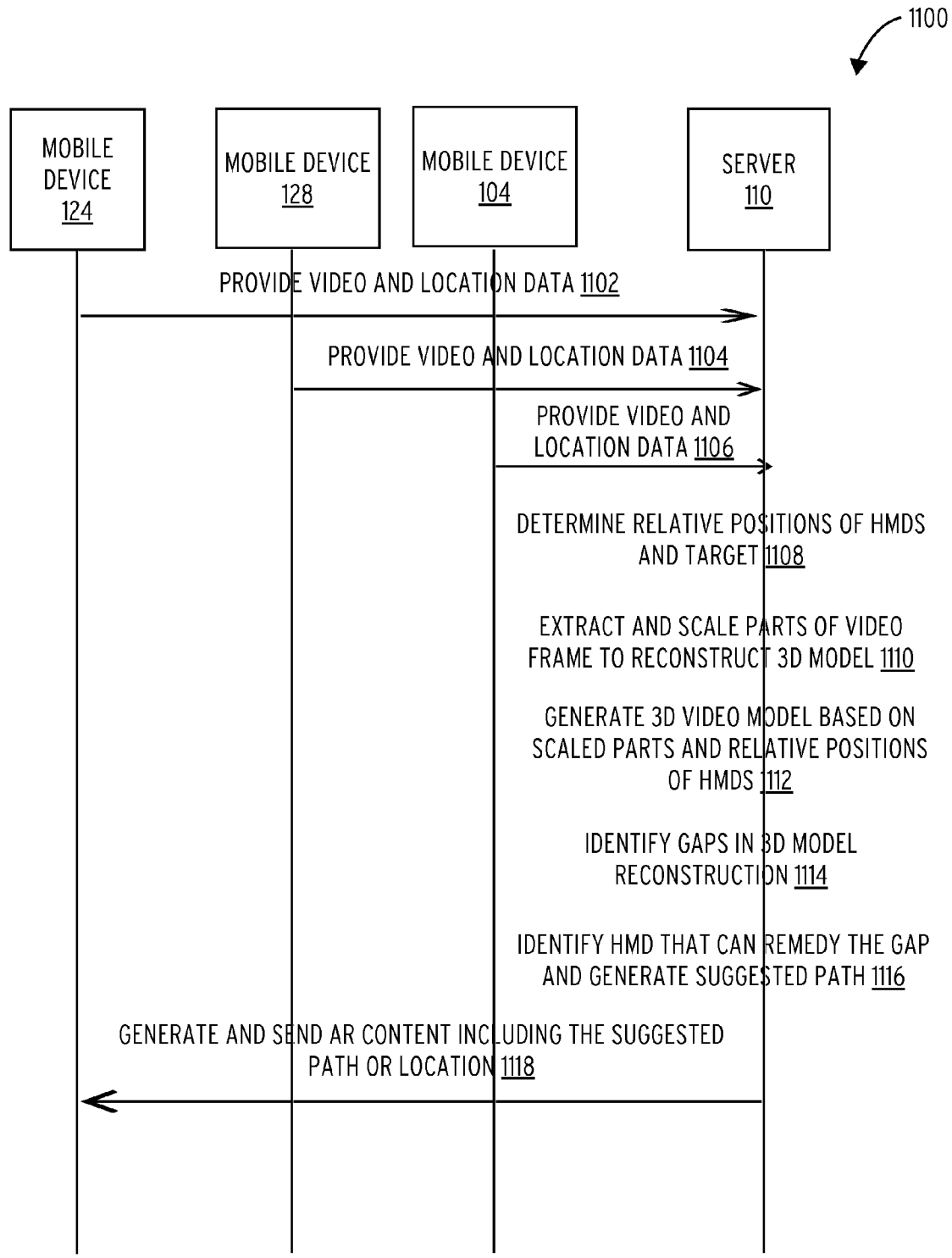
FIG. 11 is an interaction diagram illustrating an example of interactions between mobile devices and a server.

FIG. 11 is an interaction diagram illustrating an example of interactions 1100 between mobile devices and the server 110. At operation 1102, the mobile device 124 provides video and location data to the server 110. The video and location data include, for example, video data generated from cameras on the mobile device 124, depth data from depth sensors on the mobile device 124, other sensor data from the mobile device 124 that identify a geographic location of the mobile device 124, the task selected or assigned to the AR application in the mobile device 124, a physical object (e.g., the target 130) detected within a field of view of the mobile device 124, and the user profile. At operation 1104, the mobile device 128 also provides video and location data based on sensors on the mobile device 128 to the server 110. At operation 1106, the mobile device 104 also provides video and location data based on sensors on the mobile device 104 to server 110. In one example embodiment, operations 1102, 1104, 1106 may be implemented using the reconstruction server interface module 308 in each mobile device, and the external sensor interface module 406 and the head-mounted display interface module 408 in the server 110.

At operation 1108, the server 110 determines relative positions of the mobile devices 124, 128, and 104 relative to one another and relative to the target 130. In one example embodiment, operation 1108 may be implemented with the triangulation module 502 of the server 110.

At operation 1110, the server 110 extracts and scales parts of the video from the mobile devices to reconstruct a three-dimensional model of the target 130. In one example embodiment, operation 1110 may be implemented with the video frame extraction module 506 and the scaling module 504 of the server 110.

At operation 1112, the server 110 generates a 3D model based on the scaled parts and relative positions of the mobile devices. In one example embodiment, operation 1112 may be implemented with the dynamic 3D video model reconstruction module 508.

At operation 1114, the server 110 identifies gaps in the reconstructed three-dimensional model. In one example embodiment, operation 1114 may be implemented with the missing region module 510.

At operation 1116, the server 110 identifies which mobile device can remedy the gaps previously identified in the operation 1114 and generates a suggested path for the corresponding mobile device. In one example embodiment, operation 1116 may be implemented with the AR content generator 512.

At operation 1118, the server 110 generates and sends an augmented reality content that includes the suggested path or location for the corresponding mobile device that can remedy the gap identified at operation 1114. In one example embodiment, operation 1114 may be implemented with the AR content generator 512.

Figure 12:
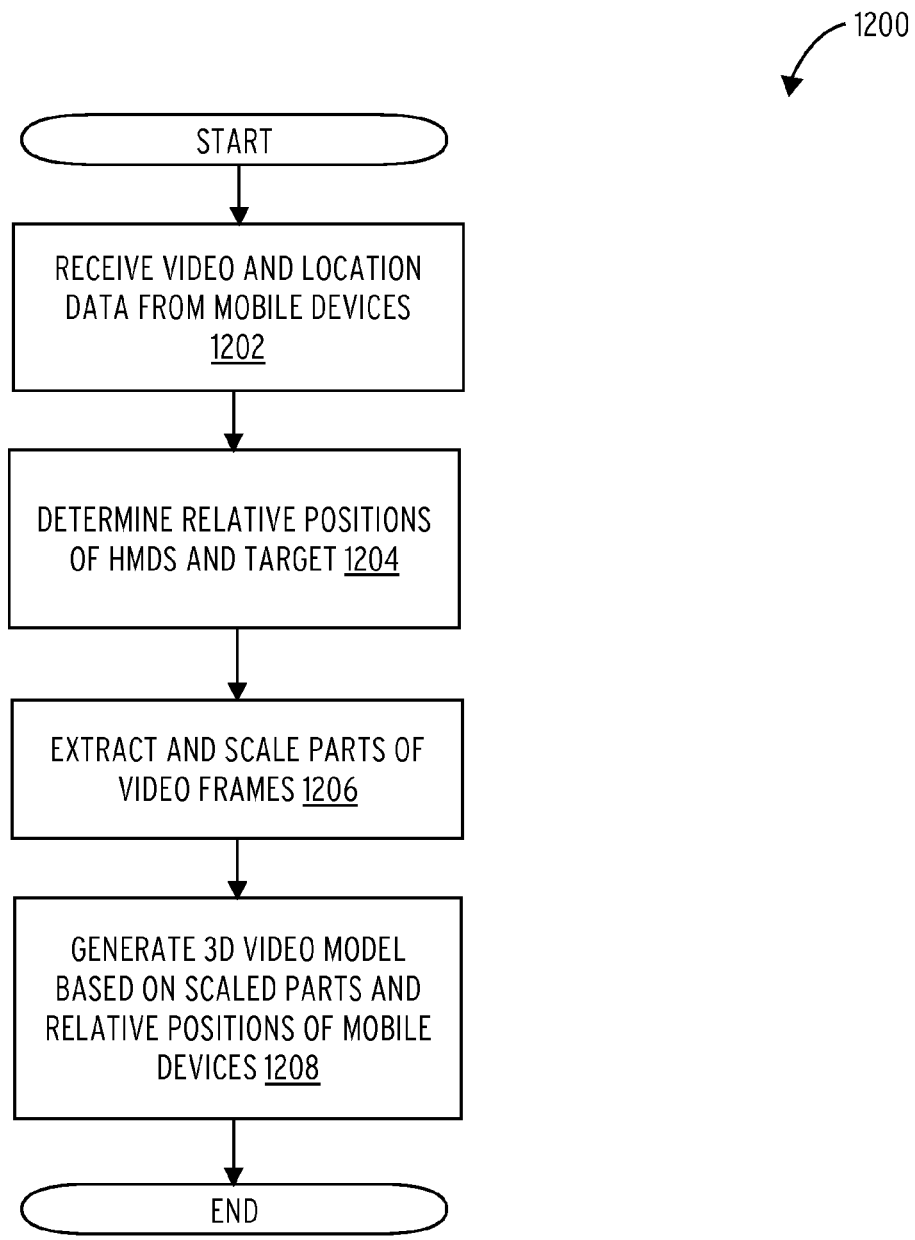
FIG. 12 is a flow diagram illustrating an example embodiment of a method for generating a three-dimensional model.

FIG. 12 is a flow diagram illustrating an example embodiment of a method 1200 for generating a three-dimensional model. At block 1202, the server 110 receives video and location data from mobile devices. In one example embodiment, block 1202 may be implemented with the external sensor interface module 406 and the head-mounted display interface module 408 of the server 110.

At block 1204, the server 110 determines the relative positions of the mobile devices and the target 130. In one example embodiment, block 1204 may be implemented with the triangulation module 502.

At block 1206, the server 110 extracts and scales portions or regions in the video frames received from the mobile devices. In one example embodiment, block 1206 may be implemented with the video frame extraction module 506 and the scaling module 504.

At block 1208, the server 110 generates a 3D model of the target 130 based on the scaled parts and relative positions of the corresponding mobile devices. In one example embodiment, block 1208 may be implemented with the dynamic 3D video model reconstruction module 508.

Figure 13:
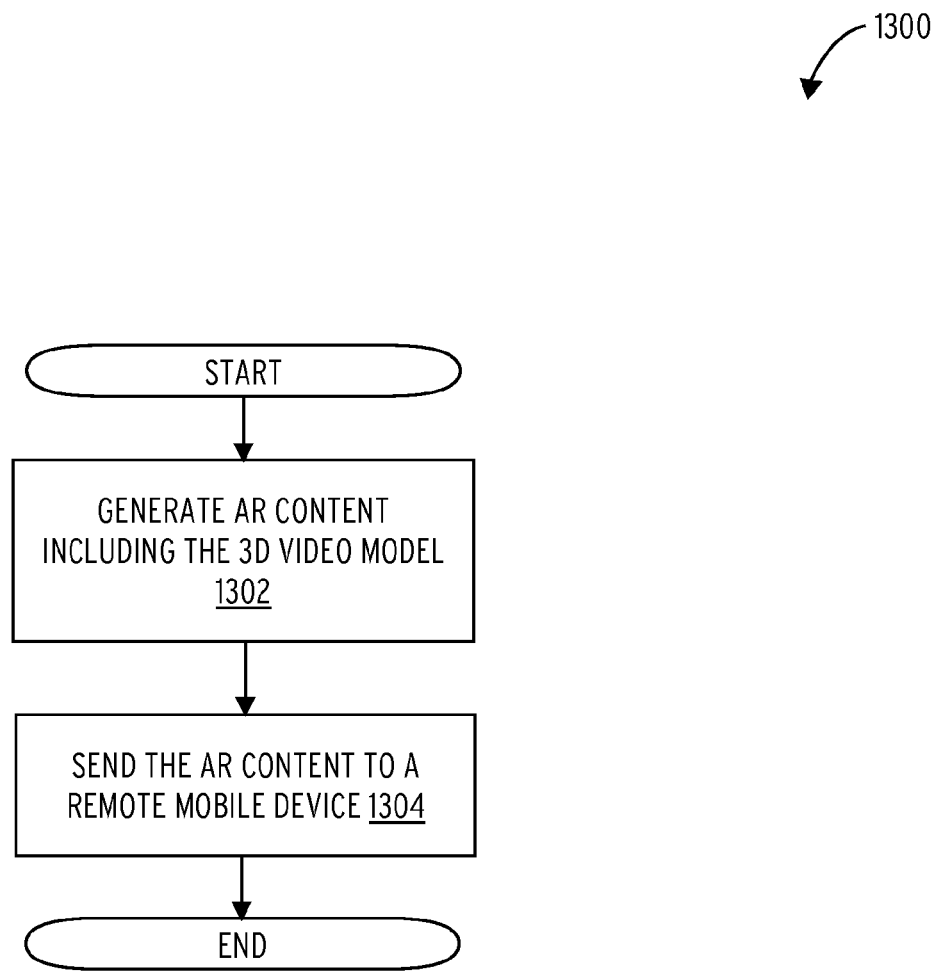
FIG. 13 is a flow diagram illustrating an example embodiment of a method for generating augmented reality content related to a three-dimensional model reconstruction.

FIG. 13 is a flow diagram illustrating an example embodiment of a method 1300 for generating augmented reality content related to a three-dimensional model reconstruction.

At block 1302, the server 110 generates AR content including a 3D model. In one example embodiment, block 1302 may be implemented with the AR content generator 512.

At block 1304, the server 110 sends the AR content to a remote viewing device (e.g., a computer or another mobile device).

Figure 14:
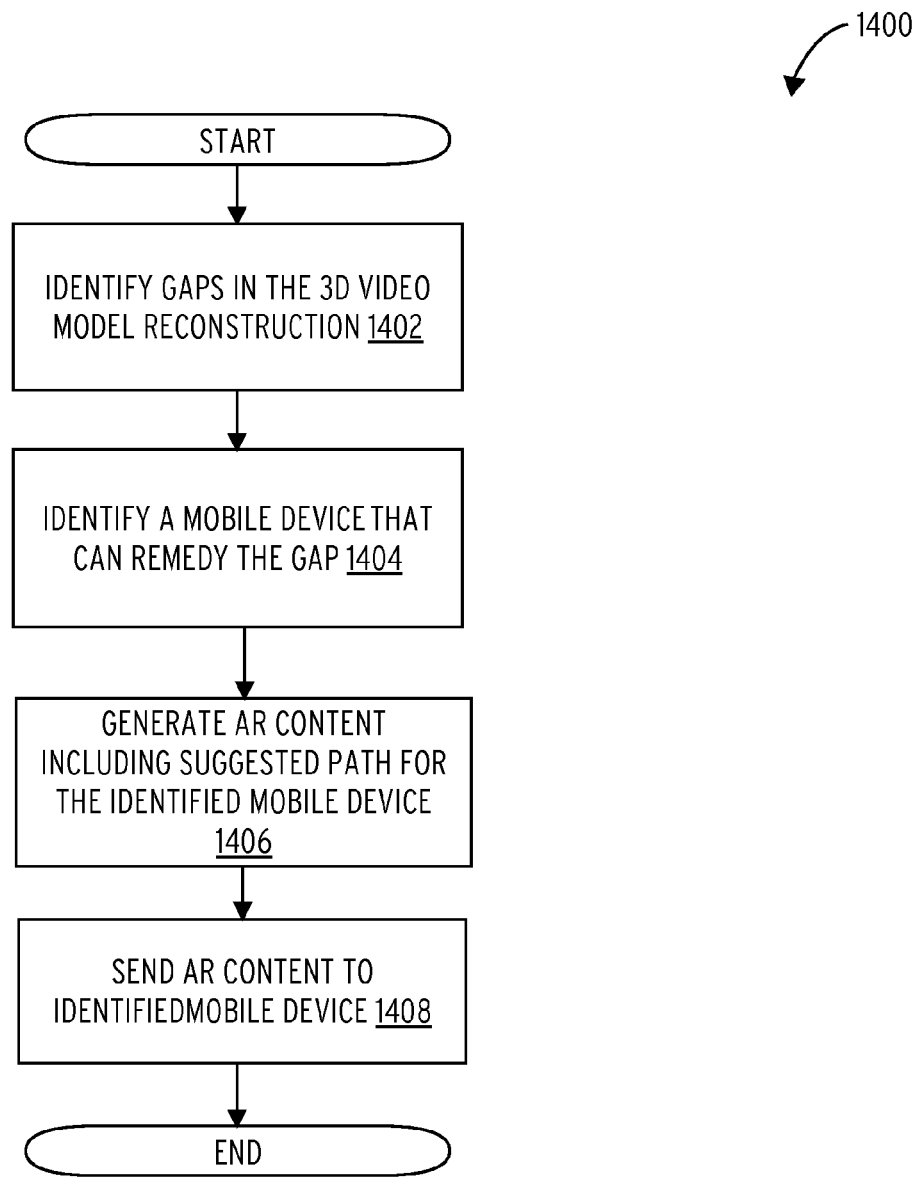
FIG. 14 is a flow diagram illustrating an example embodiment of a method for generating augmented reality content related to a three-dimensional model reconstruction.

FIG. 14 is a flow diagram illustrating an example embodiment of a method 1400 for generating augmented reality content related to a three-dimensional model reconstruction. At block 1402, the server 110 identifies regional gaps in the 3D model reconstruction. In one example embodiment, block 1402 may be implemented with the missing region module 510.

At block 1404, the server 110 identifies a mobile device that can remedy the gap. In one example embodiment, block 1404 may be implemented with the missing region module 510.

At block 1406, the server 110 generates AR content including a suggested path for the identified mobile device. In one example embodiment, block 1406 may be implemented with the AR content generator 512. At block 1408, the server 110 sends the AR content to the identified mobile device.

Figure 15:
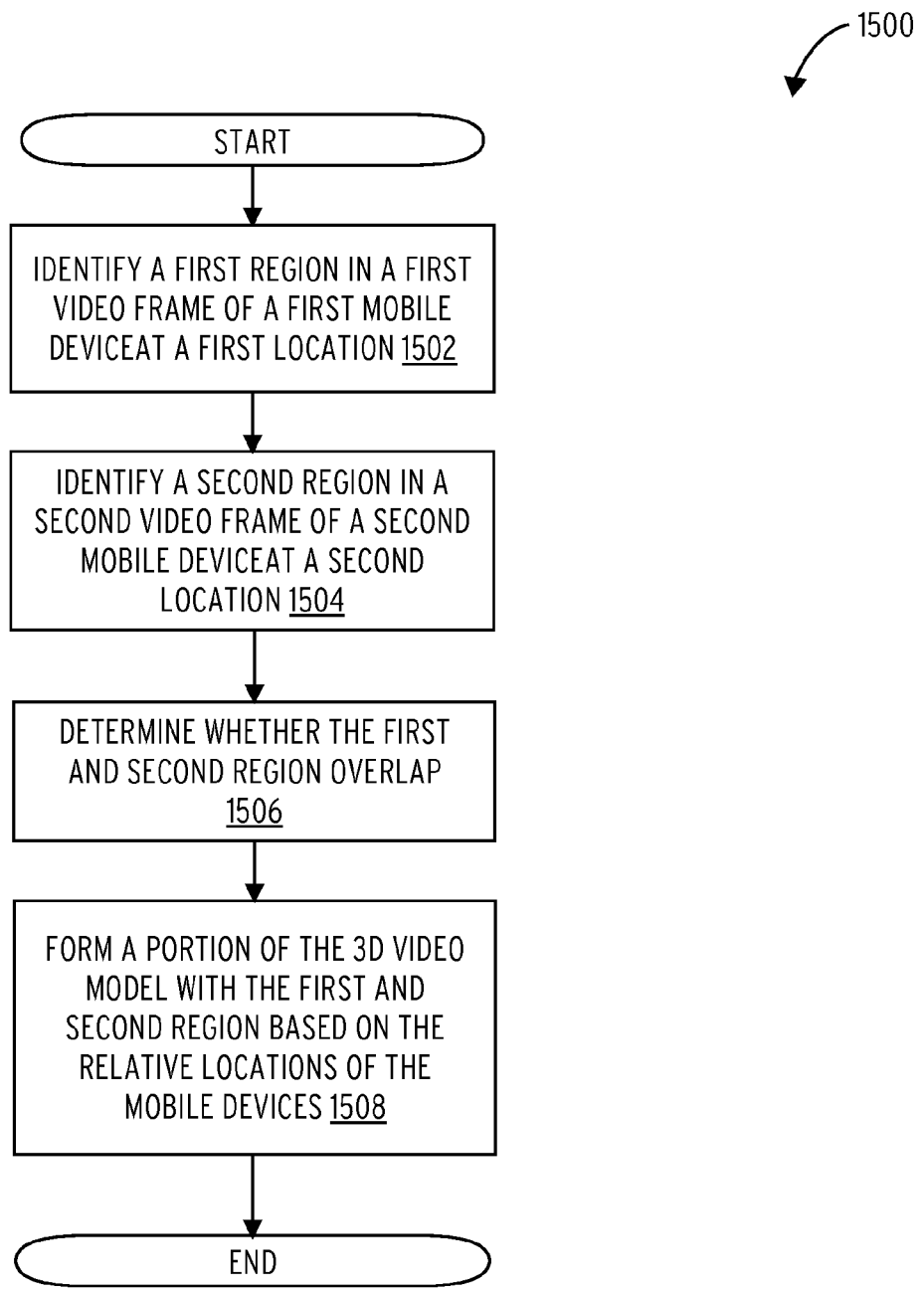
FIG. 15 is a flow diagram illustrating an example embodiment of a method for a three-dimensional model reconstruction.

FIG. 15 is a flow diagram illustrating an example embodiment of a method 1500 for a three-dimensional model reconstruction. At block 1502, the server 110 identifies a first region in a first video frame of the first mobile device at a first location. At block 1504, the server 110 identifies a second region in the second video frame of a second mobile device at a second location. At block 1506, the server 110 determines whether the first and second region overlap. At block 1508, the server 110 forms a portion of the 3D model with the first and second region based on their relative locations to the mobile device.

Figure 16:
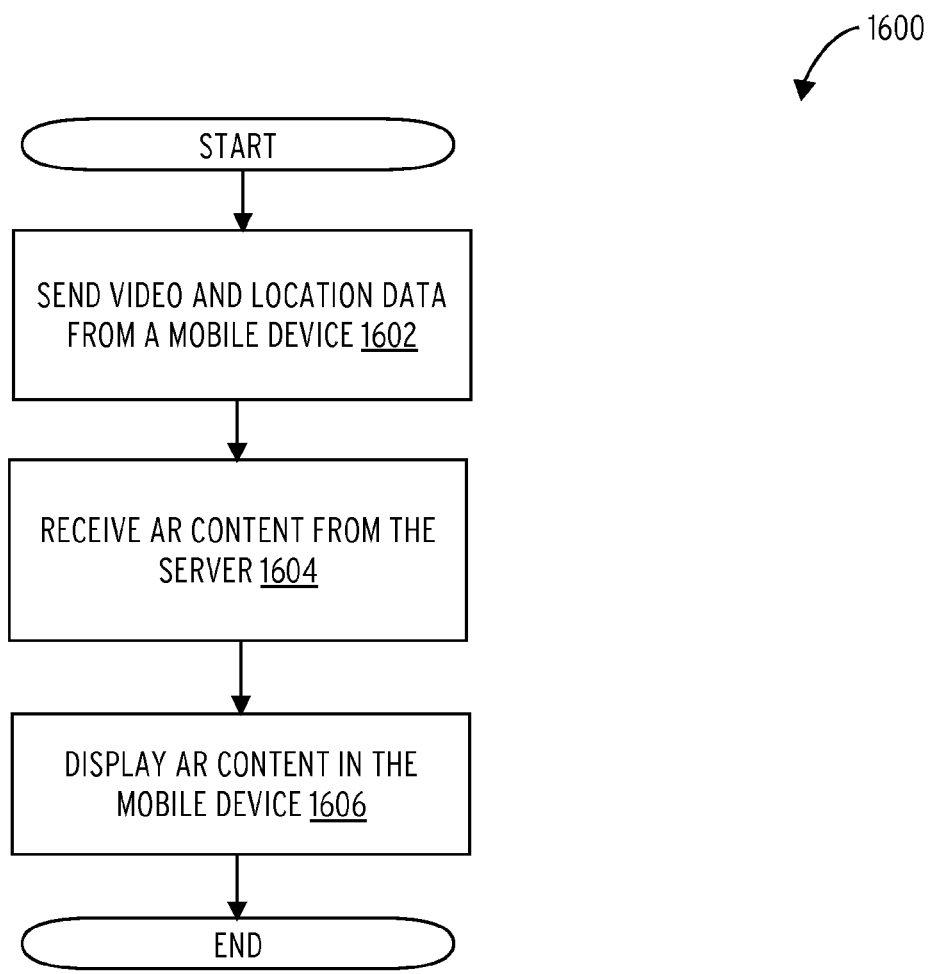
FIG. 16 is a flow diagram illustrating an example embodiment of a method for displaying augmented reality content at a mobile device for a three-dimensional model reconstruction.

FIG. 16 is a flow diagram illustrating an example embodiment of a method 1600 for displaying augmented reality content at a mobile device for a three-dimensional model reconstruction. At block 1602, a mobile device sends video and location data. At block 1604, the mobile device receives AR content from the server 110. At block 1606, the mobile device renders and displays the AR content in the transparent display of the mobile device.

Figure 17:
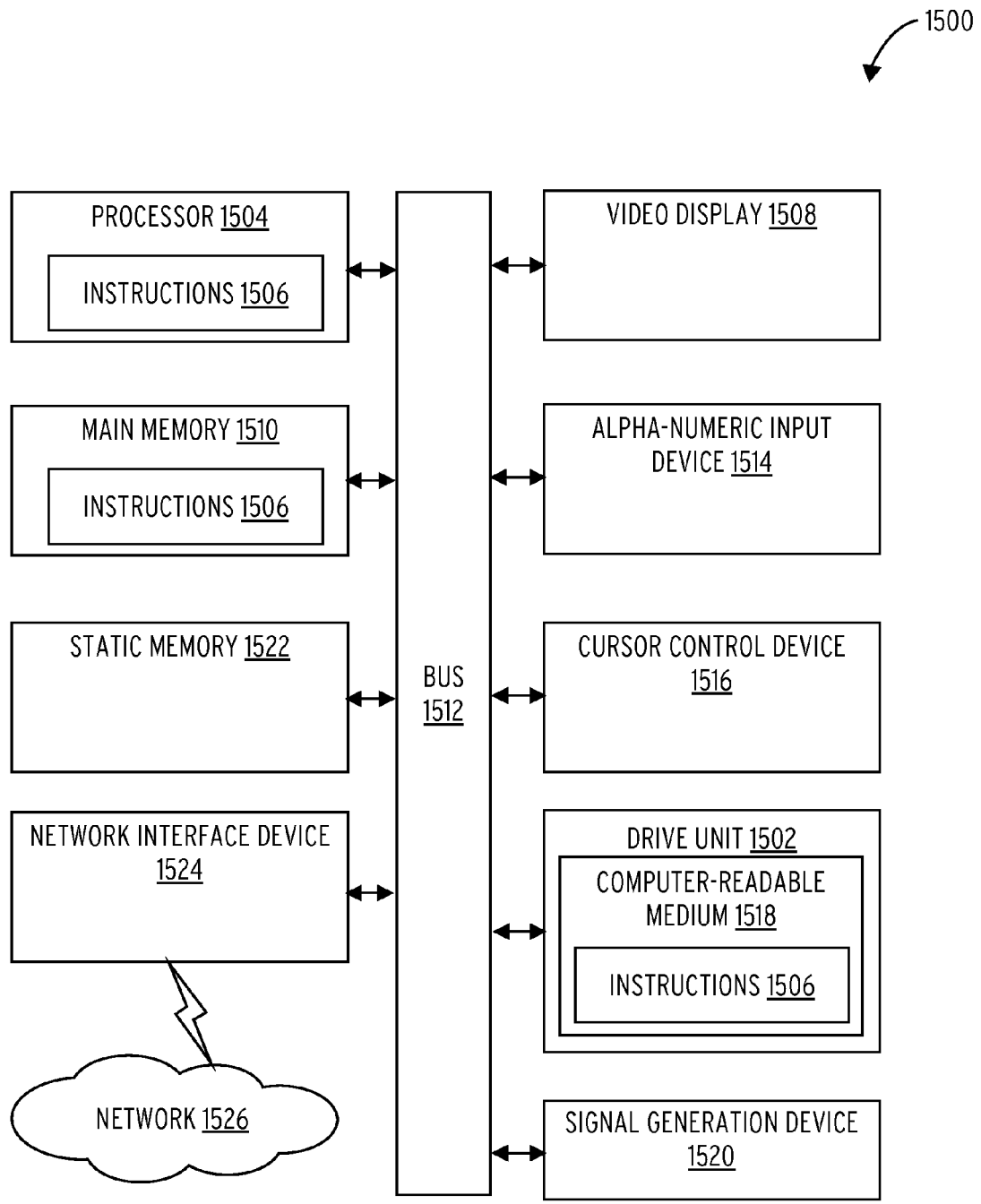
FIG. 17 a block diagram illustrating components of a machine, according to some example embodiments, able to read instructions from a machine-readable medium and perform any one or more of the methodologies discussed herein.

FIG. 17 is a block diagram illustrating components of a machine 1700, according to some example embodiments, able to read instructions 1706 from a computer-readable medium 1718 (e.g., a non-transitory machine-readable medium, a machine-readable storage medium, a computer-readable storage medium, or any suitable combination thereof) and perform any one or more of the methodologies discussed herein, in whole or in part. Specifically, the machine 1700 in the example form of a computer system (e.g., a computer) within which the instructions 1706 (e.g., software, a program, an application, an applet, an app, or other executable code) for causing the machine 1700 to perform any one or more of the methodologies discussed herein may be executed, in whole or in part.

In alternative embodiments, the machine 1700 operates as a standalone device or may be communicatively coupled (e.g., networked) to other machines. In a networked deployment, the machine 1700 may operate in the capacity of a server machine or a client machine in a server-client network environment, or as a peer machine in a distributed (e.g., peer-to-peer) network environment. The machine 1700 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1706, sequentially or otherwise, that specify actions to be taken by that machine. Further, while only a single machine is illustrated, the term "machine" shall also be taken to include any collection of machines that individually or jointly execute the instructions 1706 to perform all or part of any one or more of the methodologies discussed herein.

The machine 1700 includes a processor 1704 (e.g., a CPU, a graphics processing unit (GPU), a digital signal processor (DSP), an ASIC, a radio-frequency integrated circuit (RFIC), or any suitable combination thereof), a main memory 1710, and a static memory 1722, which are configured to communicate with each other via a bus 1712. The processor 1704 contains solid-state digital microcircuits (e.g., electronic, optical, or both) that are configurable, temporarily or permanently, by some or all of the instructions 1706 such that the processor 1704 is configurable to perform any one or more of the methodologies described herein, in whole or in part. For example, a set of one or more microcircuits of the processor 1704 may be configurable to execute one or more modules (e.g., software modules) described herein. In some example embodiments, the processor 1704 is a multicore CPU (e.g., a dual-core CPU, a quad-core CPU, or a 128-core CPU) within which each of multiple cores behaves as a separate processor that is able to perform any one or more of the methodologies discussed herein, in whole or in part. Although the beneficial effects described herein may be provided by the machine 1700 with at least the processor 1704, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1700 may further include a video display 1708 (e.g., a plasma display panel (PDP), a light emitting diode (LED) display, a liquid crystal display (LCD), a projector, a cathode ray tube (CRT), or any other display capable of displaying graphics or video). The machine 1700 may also include an alpha-numeric input device 1714 (e.g., a keyboard or keypad), a cursor control device 1716 (e.g., a mouse, a touchpad, a trackball, a joystick, a motion sensor, an eye tracking device, or other pointing instrument), a drive unit 1702, a signal generation device 1720 (e.g., a sound card, an amplifier, a speaker, a headphone jack, or any suitable combination thereof), and a network interface device 1724.

The drive unit 1702 (e.g., a data storage device) includes the computer-readable medium 1718 (e.g., a tangible and non-transitory machine-readable storage medium) on which are stored the instructions 1706 embodying any one or more of the methodologies or functions described herein. The instructions 1706 may also reside, completely or at least partially, within the main memory 1710, within the processor 1704 (e.g., within the processor's cache memory), or both, before or during execution thereof by the machine 1700. Accordingly, the main memory 1710 and the processor 1704 may be considered machine-readable media (e.g., tangible and non-transitory machine-readable media). The instructions 1706 may be transmitted or received over a computer network 1726 via the network interface device 1724. For example, the network interface device 1724 may communicate the instructions 1706 using any one or more transfer protocols (e.g., hypertext transfer protocol (HTTP)).

In some example embodiments, the machine 1700 may be a portable computing device (e.g., a smart phone, tablet computer, or a wearable device), and have one or more additional input components (e.g., sensors or gauges). Examples of such input components include an image input component (e.g., one or more cameras), an audio input component (e.g., one or more microphones), a direction input component (e.g., a compass), a location input component (e.g., a GPS receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the computer-readable medium 1718 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1706 for execution by the machine 1700, such that the instructions 1706, when executed by one or more processors of the machine 1700 (e.g., processor 1704), cause the machine 1700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1706 for execution by the machine 1700 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1706).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following embodiments describe various example embodiments of methods, machine-readable media, and systems (e.g., machines, devices, or other apparatus) discussed herein.

In some embodiments, a method may include receiving, at a server, video data and location data from a group of mobile devices, with each mobile device configured to record a video of a target, the location data identifying a position of the corresponding mobile device relative to the target and a distance between the corresponding mobile device to the target, and the location data associated with a corresponding video frame from the video data; identifying video frames from the video data captured at a same time from the group of mobile devices; scaling the parts of the identified video frames based on the position and distance of the corresponding mobile devices to the target; extracting the scaled parts of the identified video frames having overlapping content; and/or generating a three-dimensional model of the target based on the extracted scaled parts of the identified video frames from the group of mobile devices.

In some embodiments, such a method may further include forming an augmented reality content; associating the augmented reality content with an identifier of a physical object; and/or communicating the augmented reality content to an augmented reality viewing device, with the augmented reality viewing device configured to display the three-dimensional model in response to detecting the identifier of the physical object in a field of view of the augmented reality viewing device.

In some embodiments, the forming an augmented reality content may include the three-dimensional model of the target.

In some embodiments, such a method may further include identifying a missing portion on the three-dimensional model of the target, identifying a first head mounted display based on a location of the missing portion on the three-dimensional model relative to a first position and a first orientation of the first head mounted display, generating a first augmented reality content for the first head mounted display, and/or communicating the first augmented reality content to the first head mounted display.

In some embodiments, the first augmented reality content may include a suggested virtual path to guide the first head mounted display to a second position and a second orientation of the first head mounted display, with the first head mounted display configured to generate video data corresponding to the missing portion on the three-dimensional model while at the second position and the second orientation.

In some embodiments, the first mobile device may include a transparent display configured to display the suggested virtual path in the transparent display relative to a position of the target within a field of view of the transparent display.

In some embodiments, such a method may further include receiving a request from the augmented reality viewing device, with the request identifying a side view of the target; identifying a first mobile device based on its location and position and the requested side view of the target; and/or generating and communicating instructions to the first mobile device, with the instructions identifying a direction in which the mobile device is to move to generate the requested side view of the target.

In some embodiments, such a method may further include identifying a first video frame of a first mobile device and a second video frame of a second mobile device, with both first and second video frames captured at a same time; scaling the first region of the first video frame based on the position and distance of the first mobile device and the second region of the second video frame based on the position and distance of the second mobile device; and/or determining whether a portion of the first scaled region and the second region overlap and contain a substantially similar pixel pattern.

In some embodiments, the method may include the first scaled and second scaled region in a portion of the three-dimensional model of the target in response to determining that the first portion of the first scaled region and the second region overlap and contain the substantially similar pixel pattern.

In some embodiments, each mobile device may include a transparent display configured to display an augmented reality content identifying the target, a camera configured to capture video frames of the target, an inertial navigation sensor configured to determine a position and an orientation of the mobile device, a location sensor configured to determine a geographic location of the mobile device and detect a frame of reference at the geographic location of the target, and/or a processor configured to generate video data and associate a video frame of the video data with a corresponding location and position of the mobile device relative to the target and the frame of reference.

In some embodiments, the location data may include the location and position of the mobile device relative to the target and the frame of reference.

In some embodiments, each mobile device may include a transparent display configured to display an augmented reality content identifying the target, a camera configured to capture video frames of the target, an inertial navigation sensor configured to determine a position and an orientation of the mobile device, a depth sensor configured to determine a depth of the target relative to the mobile device, geographic location of the mobile device and detect a frame of reference at geographic location of the target, and/or a processor configured to generate video data and associate a video frame of the video data with a corresponding location and position of the mobile device relative to the target.

In some embodiments, the location data may include the position and orientation of the mobile device relative to the target and the depth of the target relative to the mobile device.

In some embodiments, such a method may further include generating an augmented reality content corresponding to the target, with the augmented reality content identifying a physical object as the target in the group of mobile devices and/or communicating the augmented reality content to the group of mobile devices, and each mobile device configured to display the augmented reality content as a layer on top of the physical object in a corresponding field of view of the mobile device.

In some embodiments, the group of mobile devices may include a first mobile device having a static location and forming a frame of reference with the target and/or a second mobile device moving along an undetermined path, with a location of the second mobile device determined relative to the frame of reference.

What is claimed is:

1. A method comprising:
   receiving, at a server, video data and location data from a plurality of mobile devices, each mobile device configured to record a video of a target, the location data identifying a position of the corresponding mobile device relative to the target and a distance between the corresponding mobile device to the target, the location data associated with a corresponding video frame from the video data;
   identifying video frames from the video data captured from the plurality of mobile devices;
   scaling parts of the identified video frames based on the position and distance of the corresponding mobile devices to the target;
   extracting the scaled parts of the identified video frames;
   generating a three-dimensional model of the target based on the extracted scaled parts of the identified video frames from the plurality of mobile devices;
   identifying a first video frame from the video data captured from a first mobile device and a second video frame from the video data captured from a second mobile device, both the first and second video frames captured at a same time;
   extracting a first region in the first video frame and a second region in the second video frame;
   scaling the first region of the first video frame based on the position and distance of the first mobile device, and the second region of the second video frame based on the position and distance of the second mobile device;
   determining whether a portion of the first scaled region and the second region overlap and contain a substantially similar pixel pattern; and including the first scaled region and the second scaled region in a portion of the three-dimensional model of the target in response to determining that the first portion of the first scaled region and the second region overlap and contain the substantially similar pixel pattern.

2. The method of claim 1, further comprising:
forming an augmented reality content comprising the three-dimensional model of the target;
associating the augmented reality content with an identifier of a physical object; and
communicating the augmented reality content to an augmented reality viewing device, the augmented reality viewing device configured to display the three-dimensional model in response to detecting the identifier of the physical object in a field of view of the augmented reality viewing device.

3. The method of claim 2, further comprising:
identifying a missing portion on the three-dimensional model of the target;
identifying a best positioned mobile device with a first head mounted display from among the plurality of mobile devices based on its respective location and orientation having the closest proximity to the location of the missing portion on the three-dimensional model compared to the other respective locations and orientation of the other plurality of mobile devices;
generating a first augmented reality content for the first head mounted display, the first augmented reality content including a suggested virtual path to guide the first head mounted display to a second position and a second orientation of the first head mounted display, the first head mounted display configured to generate video data corresponding to the missing portion on the three-dimensional model while at the second position and the second orientation; and
communicating the first augmented reality content to the first head mounted display.

4. The method of claim 3, wherein the first mobile device includes a transparent display configured to display the suggested virtual path in the transparent display relative to a position of the target within a field of view of the transparent display.

5. The method of claim 2, further comprising:
receiving a request from the augmented reality viewing device, the request identifying a side view of the target;
identifying the first mobile device based on its location and position and the requested side view of the target;
generating and communicating instructions to the first mobile device, the instructions identifying a direction in which the mobile device is to move to generate the requested side view of the target.

6. The method of claim 1, wherein each mobile device comprises:
a transparent display configured to display an augmented reality content identifying the target;
a camera configured to capture video frames of the target;
an inertial navigation sensor configured to determine a position and an orientation of the mobile device;
a location sensor configured to determine a geographic location of the mobile device and detect a frame of reference at a geographic location of the target; and
a processor configured to generate video data and associate a video frame of the video data with a corresponding location and position of the mobile device relative to the target and the frame of reference, the location data including the location and position of the mobile device relative to the target and the frame of reference.

7. The method of claim 1, wherein each mobile device comprises:
a transparent display configured to display an augmented reality content identifying the target;
a camera configured to capture video frames of the target;
an inertial navigation sensor configured to determine a position and an orientation of the mobile device;
a depth sensor configured to determine a depth of the target relative to the mobile device;
a location sensor configured to identify a geographic location of the mobile device and detect a frame of reference at a geographic location of the target; and
a processor configured to generate video data and associate a video frame of the video data with a corresponding location and position of the mobile device relative to the target, the location data including the position and orientation of the mobile device relative to the target, and the depth of the target relative to the mobile device.

8. The method of claim 1, further comprising:
generating an augmented reality content corresponding to the target, the augmented reality content identifying a physical object as the target in the plurality of mobile devices; and
communicating the augmented reality content to the plurality of mobile devices, each mobile device configured to display the augmented reality content as a layer on top of the physical object in a corresponding field of view of the mobile device.

9. The method of claim 1, wherein the plurality of mobile devices includes:
the first mobile device having a static location and forming a frame of reference with the target; and
the second mobile device moving along an undetermined path, a location of the second mobile device determined relative to the frame of reference.

10. A server comprising:
a processor; and
a memory storing instructions that, when executed by the processor, configure the server to:
receive video data and location data from a plurality of mobile devices, each mobile device configured to record a video of a target, the location data identifying a position of the corresponding mobile device relative to the target and a distance between the corresponding mobile device and the target, the location data associated with a corresponding video frame from the video data;
identify video frames from the video data captured from the plurality of mobile devices;
scale parts of the identified video frames based on the position and distance of the corresponding mobile devices to the target;
extract the scaled parts of the identified video frames;
generate a three-dimensional model of the target based on the extracted scaled parts of the identified video frames from the plurality of mobile devices;
identify a first video frame from the video data captured from a first mobile device and a second video frame from the video data captured from a second mobile device, both first and second video frames captured at a same time;
extract a first region in the first video frame and a second region in the second video frame;

scale the first region of the first video frame based on the position and distance of the first mobile device, and the second region of the second video frame based on the position and distance of the second mobile device;

determine whether a portion of the first scaled region and the second region overlap and contain a substantially similar pixel pattern; and include the first scaled region and the second scaled region in a portion of the three-dimensional model of the target in response to determining that the first portion of the first scaled region and the second region overlap and contain the substantially similar pixel pattern.

11. The server of claim 10, wherein the instructions further configure the server to:

form an augmented reality content comprising the three-dimensional model of the target;

associate the augmented reality content with an identifier of a physical object; and communicate the augmented reality content to an augmented reality viewing device, the augmented reality viewing device configured to display the three-dimensional model in response to detecting the identifier of the physical object in a field of view of the augmented reality viewing device.

12. The server of claim 11, wherein the instructions further configure the server to:

identify a missing portion on the three-dimensional model of the target;

identify a best positioned mobile device with a first head mounted display from among the plurality of mobile devices based on its respective location and orientation having the closest proximity to the location of the missing portion on the three-dimensional model compared to the other respective locations and orientation of the other plurality of mobile devices;

generate a first augmented reality content for the first head mounted display, the first augmented reality content including a suggested virtual path to guide the first head mounted display to a second position and a second orientation of the first head mounted display, the first head mounted display configured to generate video data corresponding to the missing portion on the three-dimensional model while at the second position and the second orientation; and communicate the first augmented reality content to the first head mounted display.

13. The server of claim 12, wherein the first mobile device includes a transparent display configured to display the suggested virtual path in the transparent display relative to a position of the target within a field of view of the transparent display.

14. The server of claim 11, wherein the instructions further configure the server to:

receive a request from the augmented reality viewing device, the request identifying a side view of the target;

identify a first mobile device based on its location and position and the requested side view of the target;

generate and communicate instructions to the first mobile device, the instructions identifying a direction in which the mobile device is to move to generate the requested side view of the target.

15. The server of claim 10, wherein each mobile device comprises:

a transparent display configured to display an augmented reality content that identifies the target;

a camera configured to capture video frames of the target;

an inertial navigation sensor configured to determine a position and an orientation of the mobile device;

a location sensor configured to determine a geographic location of the mobile device and detect a frame of reference at a geographic location of the target; and a processor configured to generate video data and associate a video frame of the video data with a corresponding location and position of the mobile device relative to the target and the frame of reference, the location data including the location and position of the mobile device relative to the target and the frame of reference.

16. The server of claim 10, wherein each mobile device comprises:

a transparent display configured to display an augmented reality content that identifies the target;

a camera configured to capture video frames of the target;

an inertial navigation sensor configured to determine a position and an orientation of the mobile device;

a depth sensor configured to determine a depth of the target relative to the mobile device;

a location sensor configured to determine a geographic location of the mobile device and detect a frame of reference at geographic location of the target; and a processor configured to generate video data and associate a video frame of the video data with a corresponding location and position of the mobile device relative to the target, the location data including the position and orientation of the mobile device relative to the target, and the depth of the target relative to the mobile device.

17. The server of claim 10, wherein the instructions further configure the server to:

generate an augmented reality content corresponding to the target, the augmented reality content identifying a physical object as the target in the plurality of mobile devices; and communicate the augmented reality content to the plurality of mobile devices, each mobile device configured to display the augmented reality content as a layer on top of the physical object in a corresponding field of view of the mobile device.

18. A non-transitory computer-readable storage medium, the computer-readable storage medium including instructions that when executed by a computer, cause the computer to:

receive, at a server, video data and location data from a plurality of mobile devices, each mobile device configured to record a video of a target, the location data identifying a position of the corresponding mobile device relative to the target and a distance between the corresponding mobile device and the target, the location data associated with a corresponding video frame from the video data;

identify video frames from the video data captured from the plurality of mobile devices;

scale parts of the identified video frames based on the position and distance of the corresponding mobile devices to the target;

extract the scaled parts of the identified video frames;

generate a three-dimensional model of the target based on the extracted scaled parts of the identified video frames from the plurality of mobile devices;

identify a first video frame from the video data captured from a first mobile device and a second video frame from the video data captured from a second mobile device, both first and second video frames captured at a same time;

extract a first region in the first video frame and a second region in the second video frame;

scale the first region of the first video frame based on the position and distance of the first mobile device, and the second region of the second video frame based on the position and distance of the second mobile device;

determine whether a portion of the first scaled region and the second region overlap and contain a substantially similar pixel pattern; and include the first scaled region and the second scaled region in a portion of the three-dimensional model of the target in response to determining that the first portion of the first scaled region and the second region overlap and contain the substantially similar pixel pattern.

* * * * *